US012242792B2

(12) United States Patent
Gil et al.

(10) Patent No.: US 12,242,792 B2
(45) Date of Patent: Mar. 4, 2025

(54) PRESENTING INTELLIGENTLY SUGGESTED CONTENT ENHANCEMENTS

(71) Applicant: Microsoft Technology Licensing, LLC, Redmond, WA (US)

(72) Inventors: Erez Kikin Gil, Bellevue, WA (US); Benjamin David Smith, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 113 days.

(21) Appl. No.: 17/791,260

(22) PCT Filed: Jan. 8, 2021

(86) PCT No.: PCT/US2021/012684
§ 371 (c)(1),
(2) Date: Jul. 7, 2022

(87) PCT Pub. No.: WO2021/142248
PCT Pub. Date: Jul. 15, 2021

(65) Prior Publication Data
US 2023/0351091 A1 Nov. 2, 2023

(30) Foreign Application Priority Data
Jan. 9, 2020 (NL) .................................... 2024634

(51) Int. Cl.
*G06F 17/00* (2019.01)
*G06F 40/106* (2020.01)
*G06F 40/166* (2020.01)

(52) U.S. Cl.
CPC .......... *G06F 40/106* (2020.01); *G06F 40/166* (2020.01)

(58) Field of Classification Search
CPC ..... G06F 40/106; G06F 40/166; G06F 40/103
See application file for complete search history.

(56) References Cited

U.S. PATENT DOCUMENTS

| 5,873,107 A | 2/1999 | Borovoy et al. |
| 9,043,196 B1 * | 5/2015 | Leydon ................. G06F 40/289 |
| | | 704/4 |

(Continued)

FOREIGN PATENT DOCUMENTS

| EP | 1128276 A1 | 8/2001 | |
| WO | WO-2020117291 A1 * | 6/2020 | .......... G06F 11/3438 |

OTHER PUBLICATIONS

"Search Report and Written Opinion Issued in Netherlands Patent Application No. N2024634", Mailed Date: Oct. 1, 2020, 9 Pages.

(Continued)

*Primary Examiner* — Laurie A Ries
(74) *Attorney, Agent, or Firm* — NovoTechIP International PLLC

(57) ABSTRACT

A method and system for identifying enhancement suggestions for a document and displaying the identified suggestions in a user-friendly manner may include examining the document to identify an enhancement for a portion of content in the document, enabling display of a first user interface element for previewing the identified enhancement as applied to the content, receiving a request to select the identified enhancement, and upon receiving the request enabling display of a second user interface element for accepting the identified enhancement. The first user interface element may provide a preview of the document post enhancement.

18 Claims, 18 Drawing Sheets

(56) References Cited

U.S. PATENT DOCUMENTS

| | | | | |
|---|---|---|---|---|
| 9,529,785 | B2* | 12/2016 | Vagell | G06F 40/166 |
| 9,720,913 | B1* | 8/2017 | Liu | G06F 16/93 |
| 10,013,396 | B2* | 7/2018 | Horn | G06F 40/197 |
| 10,282,069 | B2* | 5/2019 | Ilic | G06F 40/106 |
| 10,282,075 | B2 | 5/2019 | Maloney et al. | |
| 10,546,047 | B1* | 1/2020 | Michael | G06F 40/166 |
| 11,429,779 | B2* | 8/2022 | Li | G06F 40/47 |
| 2005/0268230 | A1* | 12/2005 | Bales | G06F 40/166 |
| | | | | 715/255 |
| 2014/0096038 | A1* | 4/2014 | Schultz | H04L 67/51 |
| | | | | 715/753 |
| 2015/0378972 | A1* | 12/2015 | Kapadia | G06F 40/197 |
| | | | | 715/229 |
| 2016/0019665 | A1* | 1/2016 | Collier | G06F 16/24575 |
| | | | | 705/40 |
| 2017/0364495 | A1* | 12/2017 | Srinivasan | G06F 3/0484 |
| 2018/0144133 | A1* | 5/2018 | Hoover | G06F 21/566 |
| 2018/0341638 | A1* | 11/2018 | Beriwal | G06F 40/103 |
| 2018/0367484 | A1* | 12/2018 | Rodriguez | H04L 51/10 |
| 2019/0155870 | A1* | 5/2019 | Prakash | G06F 40/103 |
| 2019/0243890 | A1* | 8/2019 | Kwatra | G06N 3/08 |
| 2020/0104353 | A1* | 4/2020 | Chua | G06F 16/337 |
| 2020/0293605 | A1* | 9/2020 | Nelson | G06N 20/00 |
| 2020/0293607 | A1* | 9/2020 | Nelson | G06F 40/30 |
| 2020/0301950 | A1* | 9/2020 | Lorrain-Hale | G06F 40/117 |
| 2020/0364294 | A1* | 11/2020 | Brown | G06F 40/295 |
| 2020/0379755 | A1* | 12/2020 | Boada | G06F 40/232 |
| 2020/0380061 | A1* | 12/2020 | Saar | G06F 40/166 |
| 2021/0004432 | A1* | 1/2021 | Li | G06F 40/295 |
| 2021/0011969 | A1* | 1/2021 | Chandra | G06F 9/451 |
| 2021/0397670 | A1* | 12/2021 | Cohen | G06F 3/04817 |
| 2024/0054781 | A1* | 2/2024 | Doshi | H04N 21/431 |

OTHER PUBLICATIONS

"International Search Report and Written Opinion Issued in PCT Application No. PCT/US2021/012684", Mailed Date: Apr. 20, 2021, 9 Pages.

Communication pursuant to Article 94(3) EPC Received for European Application No. 21701874.6, mailed on Jun. 25, 2024, 06 pages.

* cited by examiner

200A

210

| File | Home | Insert | Design | Review | View | Help |

220 — Water quality report

June 2017, city of contoso

The city of contoso's water comes from the tailspin river and the south fork of the woodgrove river. The water is purchased through southridge water alliance (southridge), which purchases its water from bellows public utilities. Southridge also owns lake lamna, which can serve as a future source of water if needed.

Southridge was formed in 1993 to provide a reliable municipalities in the region. In addition to contoso, fabrikam, adatum, munson, nod, the northwind pla water and sewer districts. Each member has a voice community's future by ensuring the availability of s water. As an organization, southridge also works cl providers in the central wingtip region to utilize all another source is developed. This ensures that wat the region for the future and in case of an emergen Cut
Copy
Paste
Font — 230
Paragraph
Enhance — 235
Synonym
New Comment

| File | Home | Insert | Design | Review | View | Help | 240 |

220

WATER QUALITY REPORT

JUNE 2017, CITY OF CONTOSO

The city of contoso's water comes from the tailspin river and the south fork of the woodgrove river. The water is purchased through southridge water alliance (southridge), which purchases its water from bellows public utilities. Southridge also owns lake lamna, which can serve as a future source of water if needed.

Southridge was formed in 1993 to provide a reliable source of water to municipalities in the region. In addition to contoso, members include fabrikam, adatum, munson, nod, the northwind plateau, and vanarsdel water and sewer districts. Each member has a voice in determining its community's future by ensuring the availability of safe and reliable drinking water. As an organization, southridge also works closely with all water providers in the central wingtip region to utilize all available water before another source is developed. This ensures that water will be available to the region for the future and in case of an emergency.

Over the years contoso and southridge have increased the amount of water they have been serving our community, growing from serving 1.2 million people in 2001 to 3.2 million in 2018. For more information, please visit www.southridgewater.org

MESSAGE FROM THE EPA

Enhancements 14,000 acres

| File | Home | Insert | Design | Review | View | Help | 310 |

320

THE GROUNDWATER SYSTEM

Contoso's Renewable Resource

East of the Sammamish River lies an underground water-bearing formation called an aquifer. For 60 years, the aquifer has supplied 35-40% of Contoso's drinking water. In 2017, the city's wells pumped over one billion gallons from the aquifer. The resource is considered to have a high vulnerability to potential contamination because the aquifer is extremely shallow.

Groundwater Protection

In 2003, Contoso established a Wellhead Protection Program as a way to help protect our groundwater from contamination and depletion. The Wellhead Protection Program is responsible for:

Gathering hazardous materials data and visiting businesses to help identify and eliminate sources of pollution that could contaminate groundwater. Contoso's Renewable Resource Reviewing development proposals to ensure that groundwater will not be adversely impacted.

Measuring groundwater levels and collecting samples from monitoring well throughout the city.

As a result of the Wellhead Protection Program, Redmond is in compliance with the three components of the Washington State Source Water Assessment Program: Protection Area Delineation, Contaminant Source Inventory, and Susceptibility Assessment.

FIG. 3G

PRESENTING INTELLIGENTLY SUGGESTED CONTENT ENHANCEMENTS

TECHNICAL FIELD

This disclosure relates generally to intelligent suggestion of enhancements which can be made to content, and, more particularly, to a method of and system for intelligently identifying enhancements that can be made to a document's content and presenting the identified enhancements as suggestions in a user interface.

BACKGROUND

Computer users often use various content creation applications to create content. For example, users may utilize an application to write an email, prepare a report, document their work, create a presentation and the like. Often during the content creation process, the user may not be aware of numerous visual or other types of enhancements they may be able to make to the document to make it more aesthetically pleasing or convey the desired information more clearly.

Some current applications provide mechanisms by which suggestions can be provided to the user on how to modify the content. However, these mechanisms often suffer from the technical problem of not being able to provide the suggestions in a user-friendly manner. As a result, the user may have to spend a significant amount of time examining the suggestions and determining how they may affect the document.

Hence, there is a need for improved systems and methods of intelligently identifying and presenting suggested enhancements for content.

SUMMARY

In one general aspect, the instant application describes a data processing system having a processor and a memory in communication with the processor wherein the memory stores executable instructions that, when executed by the processor, cause the data processing system to perform multiple functions. The functions may include examining a document to identify an enhancement for a portion of content in the document, enabling display of a first user interface element for previewing the identified enhancement as applied to the content, receiving a request to select the identified enhancement, and upon receiving the request, enabling display of a second user interface element for accepting the identified enhancement. The first user interface element provides a preview of the document post enhancement.

In yet another general aspect, the instant application describes a method for identifying enhancement suggestions for a document. The method may include examining the document to identify an enhancement for a portion of content in the document, enabling display of a first user interface element for previewing the identified enhancement as applied to the content, receiving a request to select the identified enhancement, and upon receiving the request, enabling display of a second user interface element for accepting the identified enhancement. The first user interface element provides a preview of the document post enhancement.

In a further general aspect, the instant application describes a non-transitory computer readable medium on which are stored instructions that when executed cause a programmable device to examine the document to identify an enhancement for a portion of content in the document, enable display of a first user interface element for previewing the identified enhancement as applied to the content, receive a request to select the identified enhancement, and upon receiving the request, enable display of a second user interface element for accepting the identified enhancement. The first user interface element provides a preview of the document post enhancement.

In yet a further general aspect, the instant application describes a computer program that, when executed, causes a programmable device to carry out the method of examining the document to identify an enhancement for a portion of content in the document, enabling display of a first user interface element for previewing the identified enhancement as applied to the content, receiving a request to select the identified enhancement, and upon receiving the request, enabling display of a second user interface element for accepting the identified enhancement. The first user interface element provides a preview of the document post enhancement.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 2A-2E are example graphical user interface (GUI) screens for enabling a user to request identification of suggested enhancements for a document, displaying the suggested enhancements and allowing the user to interactively choose which enhancements to apply to the document.

FIGS. 3A-3I depict additional example GUI screens for presenting suggested enhancements and enabling the user to interact with the suggested enhancements.

DETAILED DESCRIPTION

Figure 1:
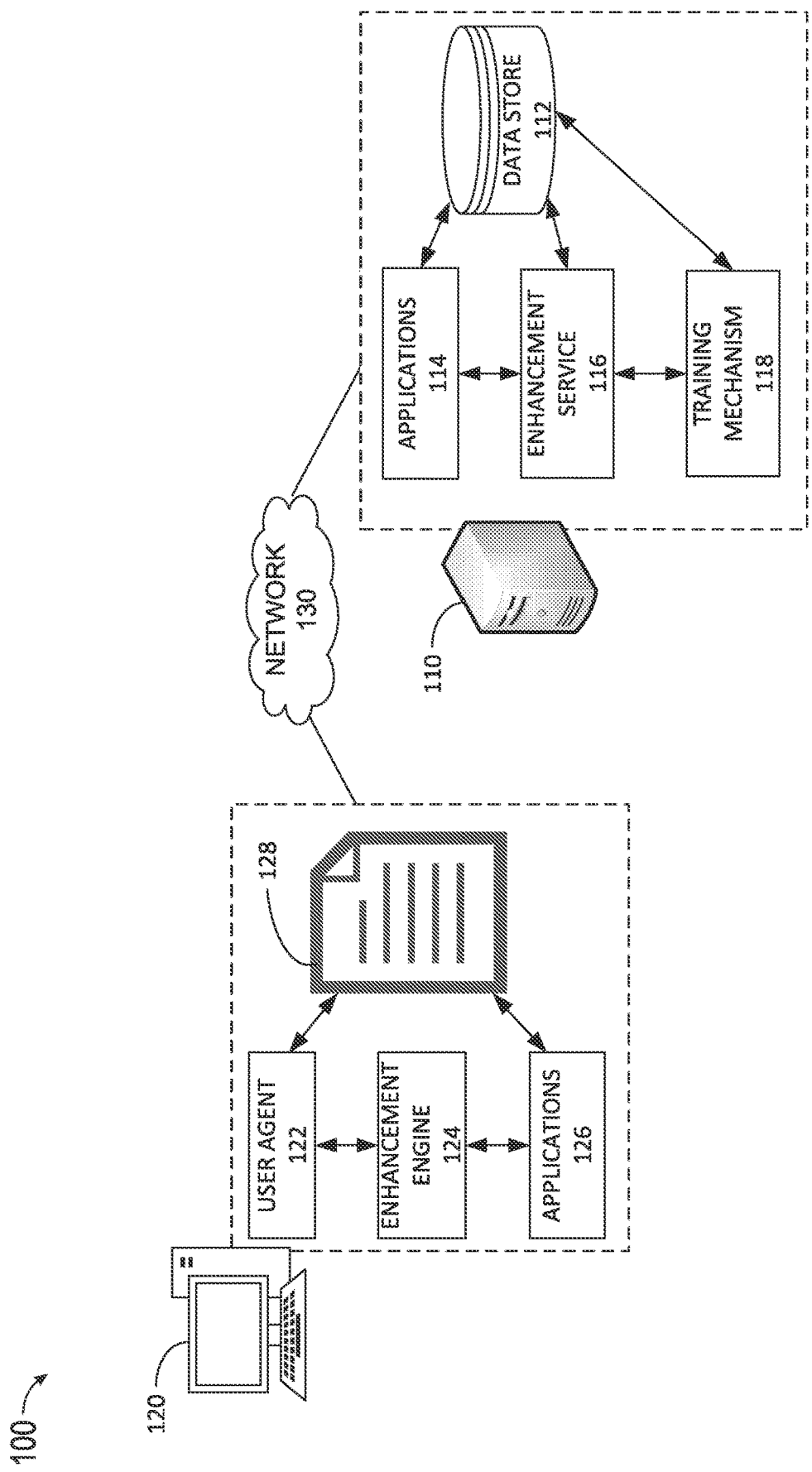
FIG. 1 depicts an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Ensuring a document that is provided for a project or published publicly is visually and/or semantically appealing, easy to understand and provides proper emphasis on the most important aspects of the document is an important task for most creators of documents. However, many users are not proficient in digital design and may not be aware of all the visual enhancement options available for a document. Furthermore, even if they are aware of the options, they may not have the time to consider all the various options and choose the most appropriate ones. In recent years, some content creation applications have begun presenting suggested enhancements for content to users. However, these are often narrowly tailored to the type of content created by the document. Furthermore, they often do not provide a mechanism by which the user can envision how the enhancements would affect the document. As a result, the user may have to try implementing each suggestion one by one to be able to envision the changes each suggestion would make and how they could affect the entire document. Furthermore, to be able to envision how all of the suggestions would influence the document, they may have to accept each suggestion to see the overall changed look. This may require a lot of time and effort on the part of the user. Thus, currently available applications suffer from the technical problem of lack of a cohesive manner by which a user can be informed of possible suggestions to content and be able to envision the content post enhancement. As a result, users often spend a significant amount of time determining how to enhance a document, and which suggested changes to accept.

To address these technical problems and more, in an example, this description provides a technical solution used for intelligently identifying potential enhancements to a document, and for displaying a visual representation of the document that includes the enhancements to provide a post enhanced document that can be compared to the original content. To do so, techniques may be used to receive a request to identify suggestions for improving the content of the document in some way, utilize one or more enhancement detection services to identify suggested enhancements, provide the suggested enhancements and display them in a manner that enables the user to envision the document post enhancement. As a result, the technical solution provides an improved method of providing suggested enhancements for content of a document within the document by enabling the user to easily review the suggestions and envision how the suggestions affect not only the enhanced content but also the entire document.

As will be understood by persons of skill in the art upon reading this disclosure, benefits and advantages provided by such implementations can include, but are not limited to, optimizing both the process of identifying suggested enhancements for a document and the process of presenting them to the user. This may be achieved by utilizing one or more machine learning (ML) models that quickly and efficiently identify suggested enhancements based on both the content of the document and user context (e.g., user history, audience, goal of the document, etc.). The identified enhancement may then be displayed by providing a visual mapping of the enhancements alongside the document. This may eliminate the need for the user to come up with their own possible enhancements to the document at the same time as it provides a manner in which the user can envision how the suggested enhancements would affect the entire document. Thus, the technical solution can increase efficiency and improve the quality of content created by users. The benefits provided by these technology-based solutions yield more user-friendly applications, enhanced content and increased system and user efficiency.

As a general matter, the methods and systems described herein may include, or otherwise make use of, a machine-trained model to identify contents related to text, images, or other types of data. Machine learning (ML) generally involves various algorithms that a computer can automatically learn over time. The foundation of these algorithms is generally built on mathematics and statistics that can be employed to predict events, classify entities, diagnose problems, and model function approximations. As an example, a system can be trained using data generated by a ML model in order to identify patterns in user activity, determine associations between various words and contents (e.g., icons, images, emoticons, animations and the like) and/or identify suggested enhancements that relate to content created by a given user. Such determination may be made following the accumulation, review, and/or analysis of user data from a large number of users over time, that may be configured to provide the ML algorithm (MLA) with an initial or ongoing training set. In addition, in some implementations, a user device can be configured to transmit data captured locally during use of relevant application(s) to the cloud or the local ML program and provide supplemental training data that can serve to fine-tune or increase the effectiveness of the MLA. The supplemental data can also be used to facilitate identification of contents and/or to increase the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of this ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying ML algorithms may be trained, such as, but not limited to, decision trees, random decision forests, neural networks, deep learning (for example, convolutional neural networks), support vector machines, regression (for example, support vector regression, Bayesian linear regression, or Gaussian process regression). As another example, size or complexity of a model may be varied between different ML models, such as a maximum depth for decision trees, or a number and/or size of hidden layers in a convolutional neural network. As another example, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be continually updated, and one or more of the models used by the system can be revised or regenerated to reflect the updates to the training data. Over time, the training system (whether stored remotely, locally, or both) can be configured to receive and accumulate more and more training data items, thereby increasing the amount and variety of training data available for ML model training, resulting in increased accuracy, effectiveness, and robustness of trained ML models.

FIG. 1 illustrates an example system 100, upon which aspects of this disclosure may be implemented. The system 100 may include a sever 110 which may be connected to or include a data store 112. The data store 112 may function as a repository in which documents and/or data sets relating to training models for providing intelligent identification of potential enhancements to content may be stored. The server 110 may operate as a shared resource server located at an enterprise accessible by various computer client devices such as client device 120. The server may also operate as a cloud-based server for offering global document enhancement services.

The server 110 may include and/or execute an enhancement service 116 for providing intelligent identification of potential enhancements to contents of a document. The enhancement service 114 may operate to detect potential areas of enhancement in a document, determine how those areas can be enhanced by using one or more ML models, determine which one of the potential enhancements to present to the user, and provided those enhancements to the application used for content creation.

Each of the models used as part of the enhancement service may be trained by a training mechanism 118. The training mechanism 118 may use training datasets stored in the data store 112 to provide initial and ongoing training for each of the model(s). In one implementation, the training mechanism 118 may use labeled training data from the data store 112 (e.g., stored user input data that is labeled) to train each of the model(s) via deep neural networks. The initial training may be performed in an offline stage.

The server 110 may also include or be connected to one or more online applications 114 that provide access to or enable creation and/or editing of one or more documents. The client device 120 may be connected to the server 110 via a network 130. The network 110 may be a wired or wireless network(s) or a combination of wired and wireless networks that connect one or more elements of the system 100. The client device 120 may be a personal or handheld computing device having or being connected to input/output elements that enable a user to interact with an electronic document 128 on the client device 120. Examples of suitable client devices 120 include but are not limited to personal computers, desktop computers, laptop computers, mobile telephones; smart phones; tablets; phablets; smart watches; wearable computers; gaming devices/computers; televisions; and the like. The internal hardware structure of a client device is discussed in greater detail in regard to FIGS. 5 and 6.

The client device 120 may include one or more applications 126. Each application 126 may be a computer program executed on the client device that configures the device to be responsive to user input to allow a user to interactively view, generate and/or edit the electronic document 128. The electronic document 128 can contain any type of data, such as text (e.g., alphabets, numbers, symbols), emoticons, gifs, still images, video and audio. The application 126 may process the electronic document 128, in response to user input through an input device, to create and/or modify the content of the electronic document 128, by displaying or otherwise presenting display data, such as a GUI which includes the content of the electronic document 128 to the user. Examples of suitable applications include, but are not limited to, a word processing application, a presentation application, a note taking application, a text editing application, an email application, a spreadsheet application, a desktop publishing application, and a communications application.

In some examples, applications used to create, modify and/or view content of an electronic document 128 may be online applications such as applications 114 that are run on the server 110 and provided via an online service as described above. In one implementation, online applications 114 may communicate via the network 130 with a user agent 122, such as a browser, executing on the client device 120. The user agent 122 may provide a user interface (UI) that allows the user to interact with application content and electronic documents stored in the data store 112. The UI may be displayed on a display device of the client device 120. In some examples, the user agent 122 may be a dedicated client application that provides a UI and access to electronic documents stored in the data store 112. In other examples, applications used to create, modify and/or view content of an electronic document maybe local applications such as the applications 126 that are stored and executed on the client device 120, and provide a UI that allows the user to interact with application content and electronic document 128.

In one implementation, the client device 120 may include a local enhancement engine 124 for identifying suggested enhancements for content of documents such as the electronic document 128. In an example, the enhancement engine 124 may operate with the applications 126 to offer some enhancement identification services locally. For example, when the client device 120 is offline, the local enhancement engine 124 may make use of one or more local or enterprise-based repositories to provide suggested enhancements.

Figure 2C:
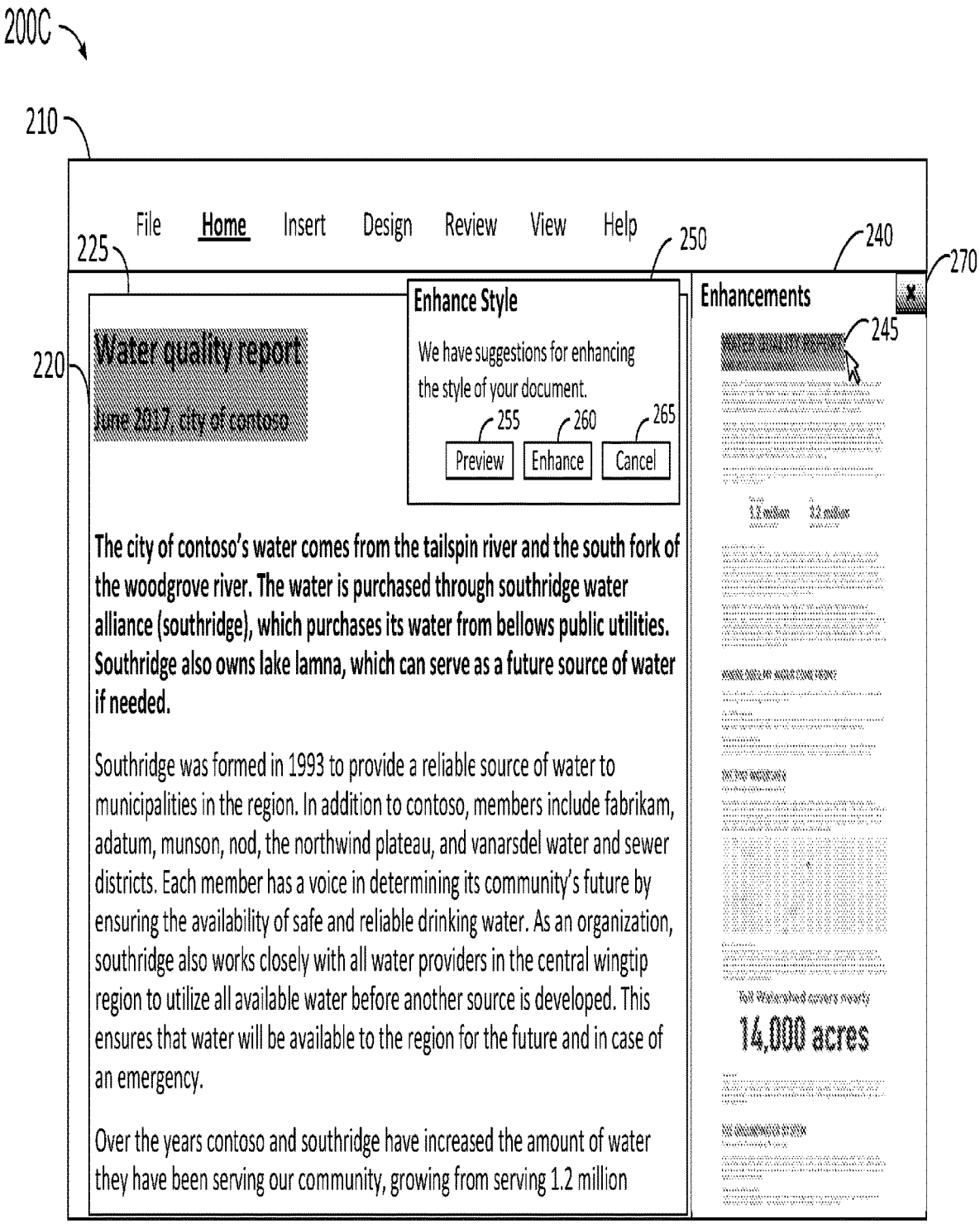
Figure 2D:
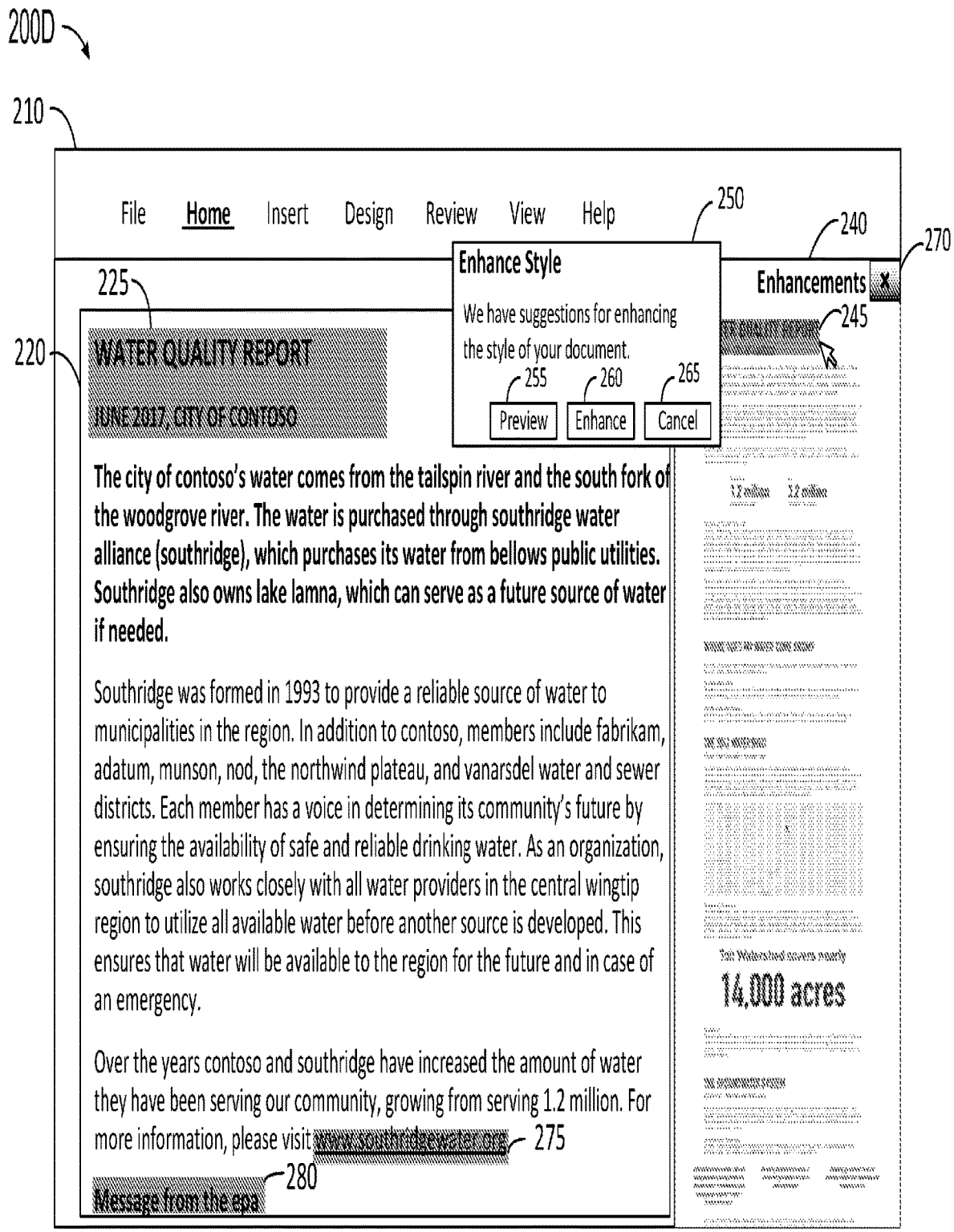

FIG. 2A-2E are example GUI screens for enabling a user to request identification of suggested enhancements in a document, displaying the suggested enhancements and allowing the user to interactively choose which enhancements to apply to the document. FIG. 2A is an example GUI screen 200A of a word processing application (e.g., Microsoft Word®) displaying an example document. GUI screen 200A may include a toolbar menu 210 containing various menu options, each of which may provide multiple UI elements for performing various tasks. For example, the toolbar menu 210 may provide options for the user to perform one or more tasks to create or edit the document. Screen 200A may also contain a content pane 220 for displaying the content of the document. The content may be displayed to the user for viewing and/or editing purposes and may be created by the user. For example, the user may utilize an input device (e.g., a keyboard) to insert input such as text or an image into the content pane 220.

As the user creates or edits the content of the content pane 220, a UI element may be provided for transmitting a request to receive suggestions for enhancing the content. The UI element may be any menu option that can be used to indicate a request by the user. In one implementation, the UI element is provided via the context menu 230. When the user utilizes an input/output device such as a mouse to right-click on the content pane, this may result in the display of the context menu 230. It should be noted that this merely presents an example manner in which the display of a UI element for invoking suggested enhancements may be initiated. Many other methods of initiating the display of a UI element for invoking suggested enhancements are possible. For example, a notification may be automatically displayed either within the application, or on a ribbon or a notifications' pane when suggested enhancements are available or when it is a good point at which suggested enhancements may be requested. Furthermore, a menu option may be provided as part of the toolbar 210 for requesting suggested enhancements. In another example, a menu option may be provided to the user to select beforehand under what conditions suggested enhancements should be provided. For example, the user may be able to choose a setting in the application that indicates when to run an automatic identification of suggested enhancements (e.g., upon completing the creation of a selected number of pages of a document). Other configurations are also contemplated.

When the context menu 230 is utilized, along with many different options for editing the document, the context menu 230 may provide a menu option 235 for requesting a display of suggested enhancements for the content of the document. In one implementation, upon selection of the menu option 235, the application may examine and provide suggested enhancements for the entire document. Alternatively, a user may be able to select a portion of the content and transmit a request for identifying suggested enhancements within the selected portion.

It should be noted that requesting and receiving suggested enhancements may occur more than once during the document creation and editing process. For example, a user may submit a request for and receive enhancement suggestions for the document at its current state during the authoring process. This may result in one or more suggestions that may be selected by the user. Later after adding more content and/or making other changes to the document, the user may submit a second request for suggestions which may result in different enhancement suggestions. Depending on the changes made to the document, the second set of enhancement suggestions may be complementary to the first set or they may be contradictory to them.

Once menu option 235 is selected, a request for providing suggested enhancements may be transmitted to an enhancement service or engine, as the case may be. Upon receipt of such a request, the enhancement service or engine may examine the content, identify possible suggested enhancements and provide them for displaying in an enhancements pane 240, such as the one displayed in FIG. 2B. The enhancements pane 240 may be displayed alongside the content pane 220 to provide a side-by-side view of the content before and after enhancement. Displaying a separate enhancements pane 240 alongside the content pane 220 may assist the user to compare an enhanced version of the document with the original version on one screen. In one implementation, the enhancements pane 240 fits the entire enhanced version of the content of the document on one page, even if the document includes multiple pages of content. This enables the user to quickly glance at the suggested enhancements and envision how the changes affect the overall look of the entire document.

Furthermore, presenting the entire post enhanced content on one page may enable the user to compare each portion of the content against the enhancement suggested for that portion on the same screen, while at the same time being able to view the overall change to the content. In this manner, the user can review the suggested enhancements within the context of both the original document and the entire enhanced document to determine if the suggestion is appropriate. For example, the user may be able to determine whether the suggestion fits the style of the original previous or next paragraphs, and/or if the suggestion fits the style of the enhanced previous or next paragraphs. When the content of a document spans the length of more than one page, presenting the post enhanced document on the preview pane may involve performing scaling operations to ensure the entire content fits onto the preview pane. This process may involve scaling the content to a size that can be rendered properly on the preview pane. It should be noted that although it is shown on a separate pane in screen 200A, other UI configurations may be utilized to display suggested enhancements. For example, a pop-up menu may be used, in one implementation.

Additionally, although the enhancements pane 240 is shown as being located adjacent to the content pane 220 and on the right side of the GUI screen 200B, the enhancements pane 240 may be located anywhere within the GUI screen. Any other method for displaying the enhancements pane 240 simultaneously on the same screen as the content pane 220 may be utilized. Furthermore, while the enhancements pane 240 may display the entire enhanced document on the screen at one time, one or more options may be provided for zooming in or out of the enhancements pane to review a portion more closely. For example, a zooming menu option (not shown) may be provided within the enhancements pane 240 for enlarging a section of the enhancements pane 240. Moreover, for documents that are lengthy (e.g., more than a predetermined number of pages long), the enhancements pane 240 may display only a certain number of pages together on one screen to ensure that the enhanced version is not too small for viewing. In such a case, a scrolling menu option (e.g., a scroll bar) may be provided for enabling the user to scroll through the enhanced version provided in the enhancements pane 240. In one implementation, the enhancements pane 240 may be linked with the content pane 220 in such a way that scrolling through the enhancements pane 240 to move to a different portion may automatically cause the content pane 220 to display the corresponding portion of the content (e.g., the enhancements pane 240 and the content pane 220 provide synchronized scrolling). When the user is done interacting with the enhancements pane 240, a close pane menu option 270 may be utilized to remove or hide the enhancements pane 240.

In one implementation, the user can interact with the enhancements pane 240 to determine how the suggestions affect the document. For example, as illustrated in the GUI screen 200C of FIG. 2C, selecting a portion 245 of content of the enhancements pane 240 may result in displaying a UI element 250. The UI element 250 may be a pop-up menu option that provides additional information about the types of enhancements provided in the selected portion 245 of the enhancements pane 240. In an example, the UI element 250 may list the types of suggested enhancements made to the selected portion 245. This may include broadly stating that the enhancement is related to text or to visual aspects of the content (e.g., enactments are available for style, font, images, visual emphases and the like). Additionally, the information provided in the UI element 250 may include the specific type of enhancement suggested. In an example, this may include providing a list of suggested enhancements. Such a list may state suggestions include changing the font to a specific font, changing the font size, changing the style of headings, the style of the body, and the like. In this manner, the UI element 250 may provide a specific list of enhancements provided in the selected portion 245 such that the user can make an informed decision. In one implementation, such information may be made available if the user desires to review it. For example, a menu option (e.g., a button or link) may be provided within the UI element 250 for displaying more information about the enhancements suggested.

Selecting a portion of the content in the enhancement pane 240 may be made in a number of different ways. These may include hovering over an area, highlighting an area by clicking and dragging the pointer over it, or simply clicking on an area. In an example, hovering (e.g. with a pointer) over an area of the enhancement pane 240 for an amount of time that surpasses a predetermined period of time may constitute as selecting a suggested enhancement made to the area. For example, when the user hovers over the portion 245 for more than a predetermined amount of time (e.g., more than 5 seconds), the application may examine the portion of the content adjacent to or near the pointer to determine what suggested enhancements if any were made to the content. If suggested enhancements have been made to portions of the content near the pointer, then the portion that displays the suggested enhancements may be highlighted to depict the enhancements more clearly. In one implementation, a corresponding portion of the content in the content pane 220 may be highlight simultaneously to enable the user to quickly compare the original content against the enhanced content. This is depicted in screen 200C, where hovering over portion 245 of the enhancements pane 220 causes both the portion 245 and the portion 225 to be visually emphasized (e.g., highlighted).

In one implementation, selecting an area of the enhancements pane 240 may result in the selected area being zoomed into or being displayed in a pop-up display element to enable the user to view the changes more clearly. This may enable the user to view the original version of the content against the enhanced version in a comparable size.

Referring back to the UI element 250, in addition to providing information about the type of enhancements made to the selected area, the UI element 250 may also display a menu option 255 for previewing the suggested enhancements within the content pane 220. Selecting the menu option 255 may result in the suggested enhancements being temporarily made within the content pane 220. This is depicted in the GUI screen 200D of FIG. 2D, where the content pane 220 displays the enhanced version of content portion 225 instead of the original version displayed in the GUI screen 200C. In an example, the preview displays the enhanced portions in a way that is easily distinguishable from the remainder of the content. For example, as depicted in the GUI screen 200D, the content portions 225, 275 and 280 which include enhancements are highlighted to bring attention to them. In this manner, the user can easily and quickly identify the enhanced portions and determine whether the changes are acceptable.

Once the user previews the changes in the preview screen 200D or if they choose to accept them without first previewing them within the content pane 220, the user can choose the menu option 260 of the UI element 250 to accept the suggested enhancements. In one implementation, selecting the enhance menu option 260 may only apply the suggested enhancements selected in the enhancements pane 240 and not the entirety of the suggested enhancements. This enables the user to go through each suggested enhancement one by one to determine whether they approve each of the suggestions for their document. If after reviewing the suggested enhancement, the user decides that the enhancement should not be applied to the document, they may select the menu option 265 to cancel selection of the area portion 245.

In one implementation, selecting the menu option 265 may also indicate that the user rejected the suggested enhancement displayed in the selected portion. Alternately, a separate menu option may be provided for rejecting the suggested enhancement.

Selecting the enhance menu option 260 may result in the suggested enhancements being applied to the content pane 220 permanently. The result is depicted in the GUI screen 200E of FIG. 2E, where the suggested enhancements are simply displayed in the content pane 220 without any highlighting. Once a suggested enhancement has been accepted or rejected, the application may mark the suggested enhancement as having been reviewed. In one implementation, if a suggested enhancement is rejected, the enhancements pane 240 may remove the suggested enhancement such that it is no longer displayed. This may enable the user to view the other suggested enhancements in a version of the content that more closely resembles the final version. In one example, rejecting or accepting a selected enhancement may result in the automatic selection of a next enhancement in the enhancements pane. In one implementation, the enhancements pane can include an indication of which enhancement suggestions the user has already reviewed, and which ones are yet to be reviewed. For example, a visual emphasis (e.g., highlighting, different color text or background, etc.) may be placed on enhancement suggestions that have not been reviewed yet.

Figure 3A:
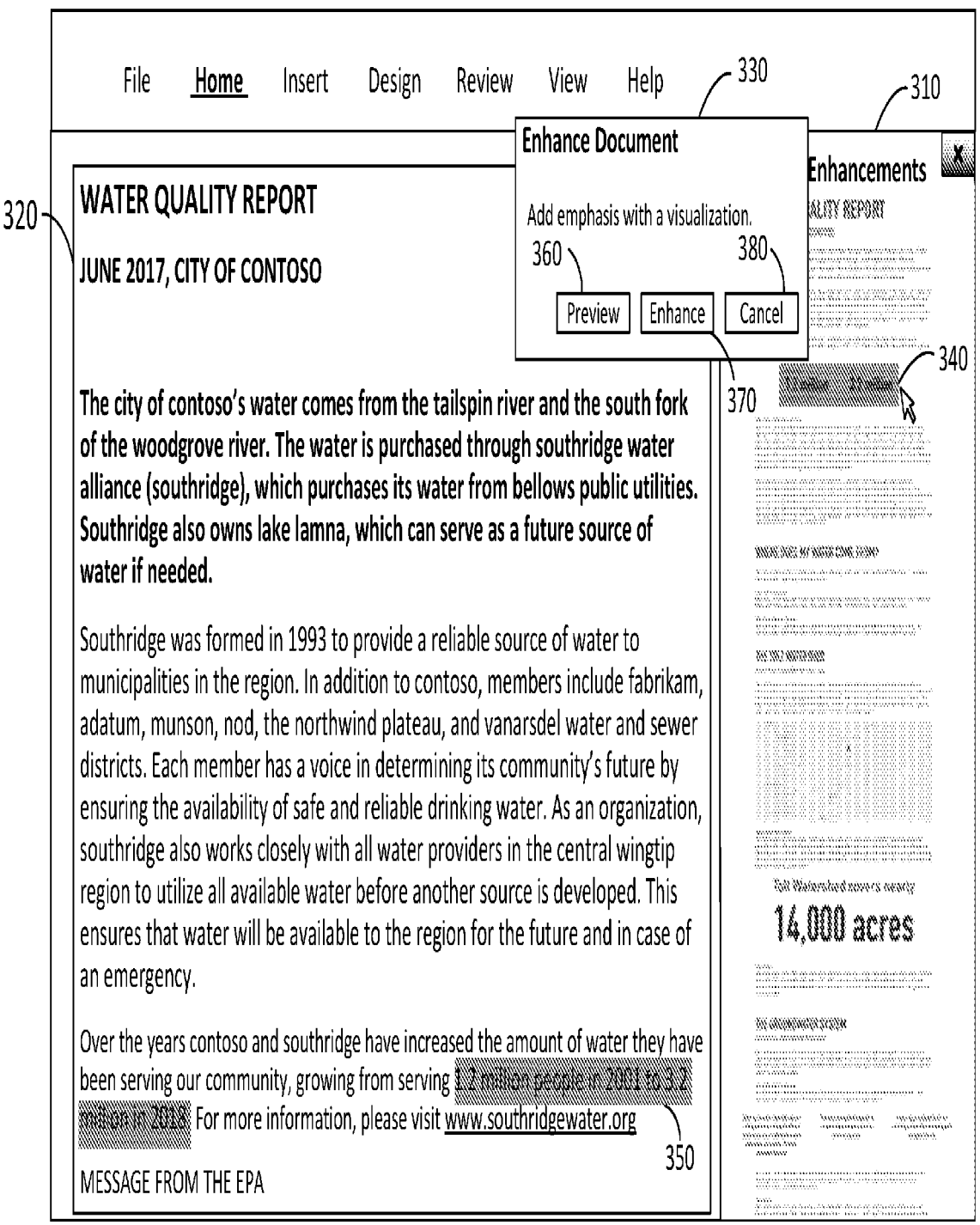

FIGS. 3A-3I depict additional example GUI screens for presenting suggested enhancements and enabling the user to interact with those suggested enhancements. FIG. 3A depicts an example GUI screen 300A in which a suggested enhancement that provides visualization emphasis is selected. In the enhancements pane 310 of GUI screen 300A, selecting the content portion 340 results in the corresponding content portion 350 being highlighted in the content pane 320. This may provide for an easy comparison between the original and enhanced content. Furthermore, selecting the content portion 340 may lead to the display of the UI element 330. Similar to the UI element 250 of FIGS. 2C-2D, the UI element 330 may provide some information about the type of enhancement provided in the selected portion (e.g., visualization emphasis). Additionally, the UI element 330 may provide menu option 360 for displaying a preview of the suggested enhancement within the content pane 320 and menu option 370 for accepting the suggested enhancement. As discussed above, accepting the suggested enhancement may result in the enhancements being permanently applied to the corresponding content in the content pane 320. In such a case, any visual emphasis (e.g., highlighting) placed on the corresponding content may be removed and the UI element 330 may disappear from the screen 300A. If the user decides to reject the suggested enhancement, they may select the menu option 380. This may remove any visual emphasis (e.g., highlighting) placed on the corresponding content in the content pane 320 and the selected content in the enhancements pane 310. Selecting the menu option 380 may also remove the UI element 330 from the display screen and mark the suggested enhancement provided in the selected content as rejected.

Figure 3B:
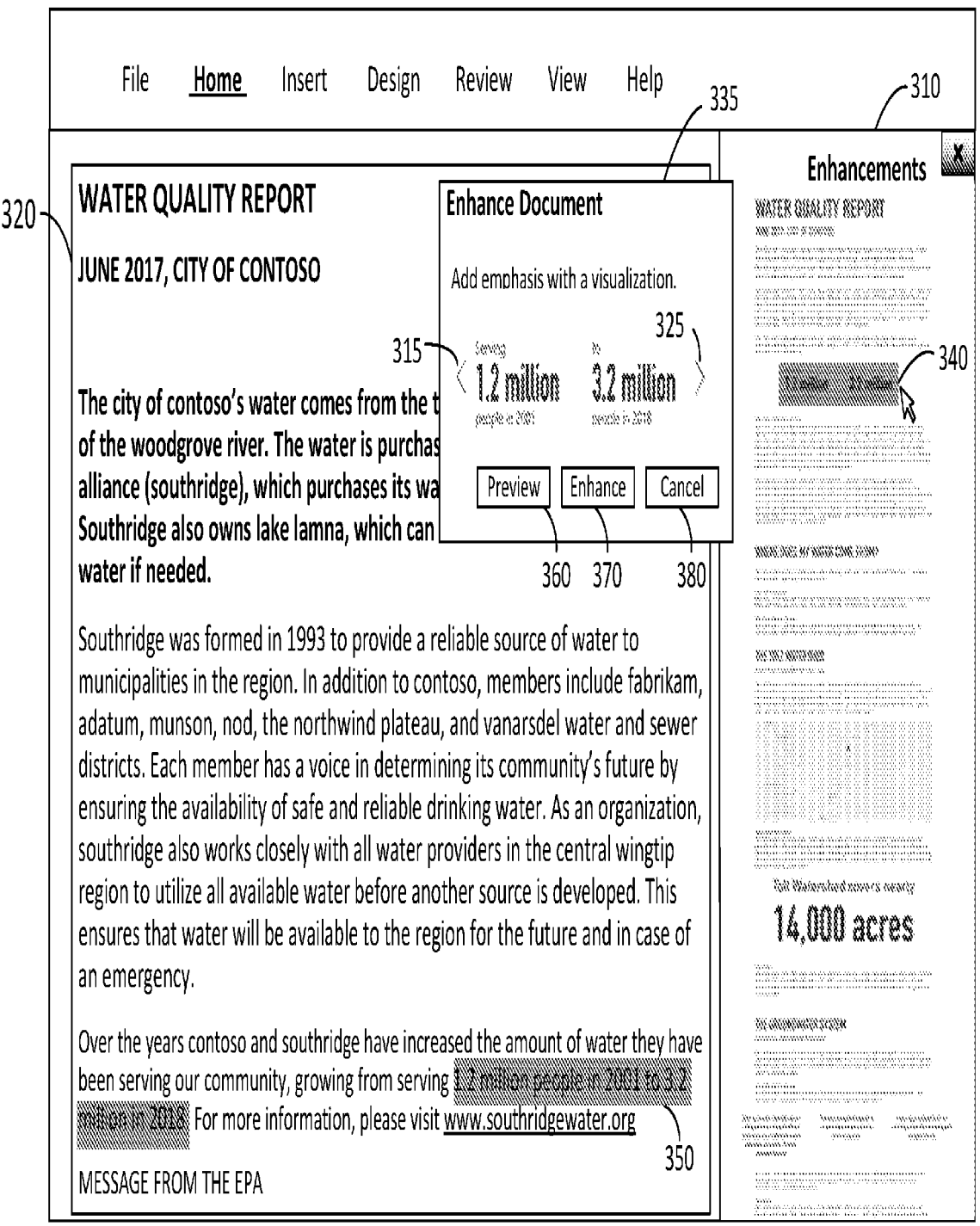

FIG. 3B depicts an alternative example GUI screen 300B in which selecting a suggested enhancement that provides visualization emphasis results in displaying a UI element 335. The UI element 335 may be displayed in instances where there is more than one type of suggested enhancement for a selected portion. For example, the enhancement service may determine that there are multiple manners in which visualization emphasis for the phrase "1.2 million people in 2001 to 3.2 people in 2018" may be made and at least two of those are likely to fit well with the content of the document. As a result, once the suggested enhancement is selected in the enhancements pane, the UI element 335 may enable the user to cycle through the possible suggested enhancements by utilizing the backward scrolling icon 315 and forward scrolling icon 325. In one implementation, determining which types of enhancements to suggest may be made in accordance with to a scoring mechanism whereby a score is calculated based on a plurality of parameters for each identified enhancement. The plurality of parameters may depend on content and context of the document, user history, history of users within an enterprise, global history of users, style of the document, and the like, as discussed in more detail below. Once a score is calculated for identified enhancements, those enhancements having a score that is higher than a predetermined threshold may be selected for presenting to the user. In one implementation, the scoring process is achieved via a ML model. Other known mechanisms for determining which enhancements to suggest to the user may also be utilized.

Once the highest score suggestions have been identified, the enhancement having the highest score may displayed within the UI element 335 when the UI element is first displayed. This would allow the user to view the highest-ranking suggested enhancement first. Lower scored suggested enhancements may then be accessed by utilizing the backward and forward scrolling icons 315 and 325. In an example, as the user moves through the suggested enhancements in the UI element 335, the selected portion 340 changes to reflect the suggested enhancement displayed within the UI element 335. In this manner, as the user moves through the suggestions, they can view the resulting enhancement within the context of the entire content displayed in the enhancement pane 310. Other configurations may be used to provide multiple suggested enhancements for a selected portion. For example, backward and forward scrolling icons may be provided within the enhancements pane 310. Alternatively, a drop-down menu icon may be displayed next to each suggested enhancement within the enhancements pane 310. Once the user views all of the suggested enhancements for a selected portion, they may choose to apply one to the content, by clicking on the enhance menu option 370.

Figure 3C:
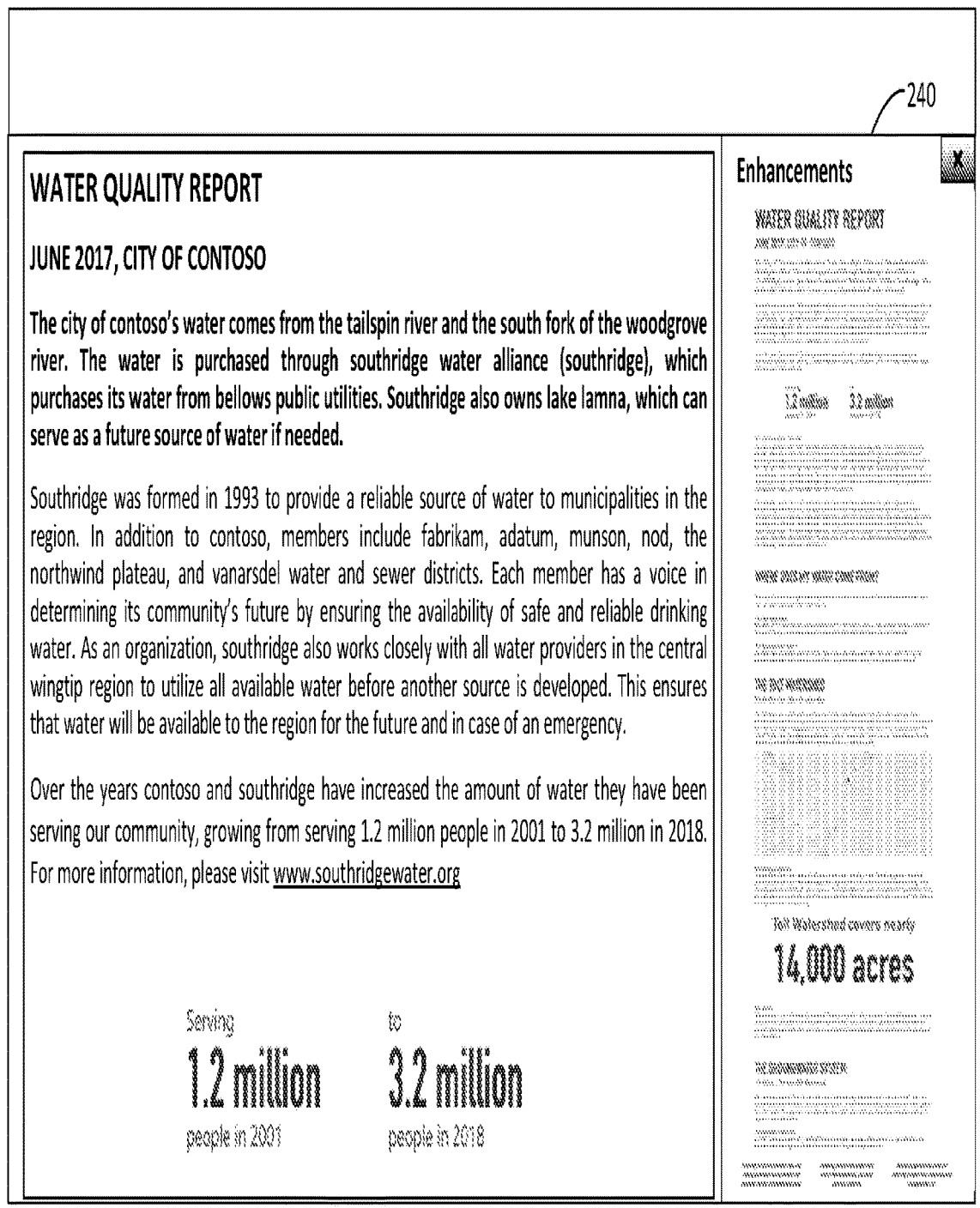

FIG. 3C depicts an example GUI screen 300C for displaying the content pane 320 after the visualization enhancement has been applied to the content. As can be seen, by visually enhancing the phrase "1.2 million people in 2001 to 3.2 people in 2018," emphasis can be added to an important portion of the content, thus significantly improving the presentation of the document.

Figure 3D:
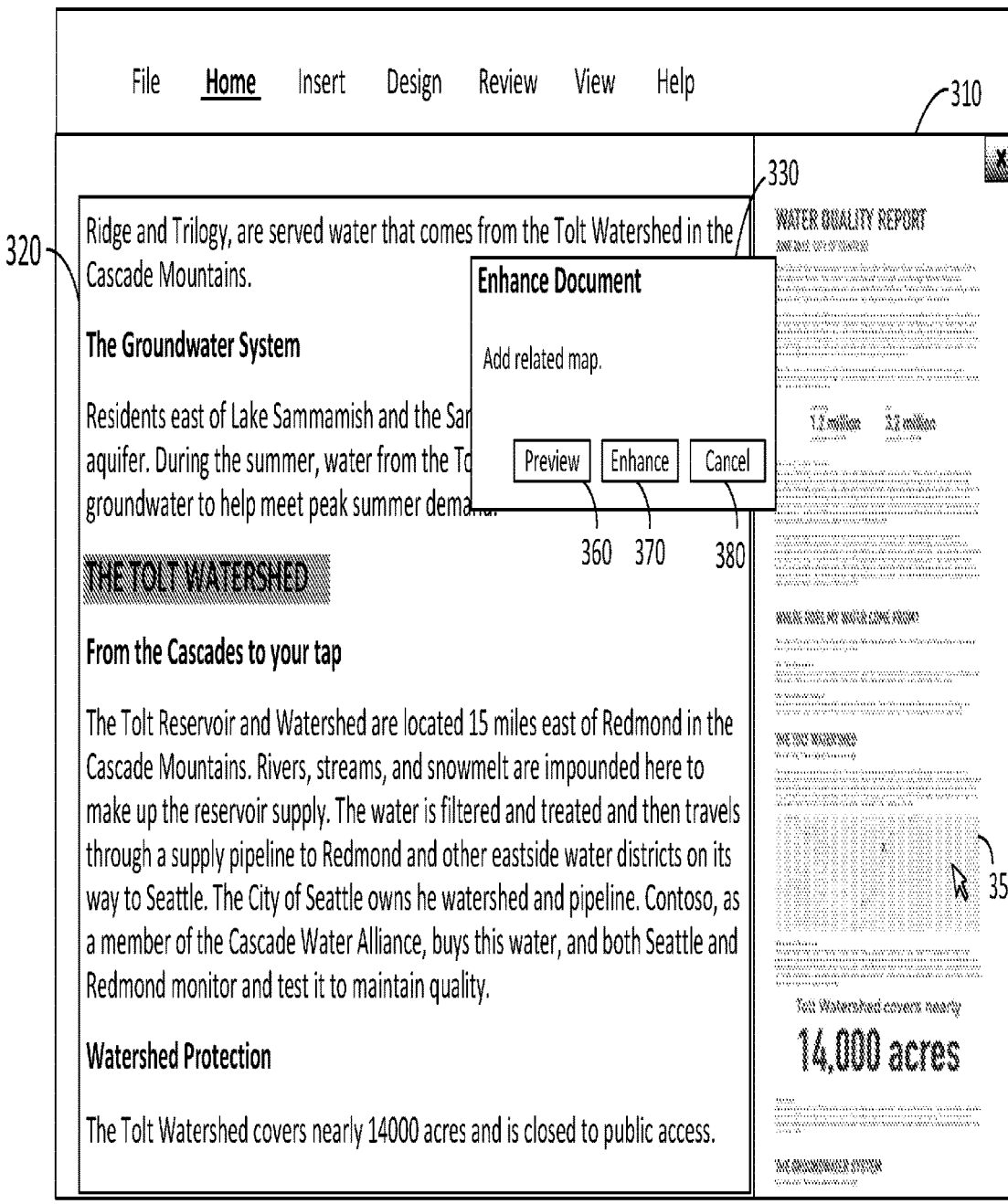

FIG. 3D depicts an example GUI screen 300D in which a suggested enhancement that identifies a map corresponding to the content of the document is selected. In one implementation, identifying suggested enhancements may include searching for available images, maps, animations, Graphic Interchange Formats (GIFs), emoticons and the like that correspond with the content and/or context of the document. This may involve dividing the content of the document into small segments and conducting an online search (e.g., using one or more publicly available search engines or intra-enterprise search engines) for each of the segments. In an example, to increase efficiency, this process may also include eliminating segments that are not perceived as being important to the document before search is conducted. In another example, the search may only be done for headings, names, portions of the content that have visualization emphases (e.g., are bold, italicized, larger or different font, etc.), specific keywords and the like. Once an image, map, animation, GIF, emoticon and the like that closely corresponds with the content of the document has been identified, an ML model may be used to determine if the identified enhancement fits well within the content. For example, in the content pane 320, the ML model may examine the segments before and after the segment searched for to determine if the identified suggestion fits well with the content. In the case of the identified map of FIG. 300E, the ML model may detect that the text includes phrases that refer to a location (e.g., located 15 miles east of Redmon in the Cascade Mountains . . . "). This may indicate that a map is well-suited for this document. When that determination has been made, the identified image, map, animation, GIF, emoticon and the like may be presented as a suggested enhancement in the enhancements pane 310. An example of this is illustrated by the selected content 355, which is a map corresponding to the heading "The Tolt Watershed" in the content. As discussed above, selecting the content portion 355 in the enhancements pane 310 results in the corresponding content ("i.e., "The Tolt Watershed") being highlighted in the content pane 320. This may enable the user to quickly determine what portion of the document, a map or image is suggested for. Furthermore, selecting the content portion 355 may lead to the display of the UI element 330, as discussed above.

Figure 3E:
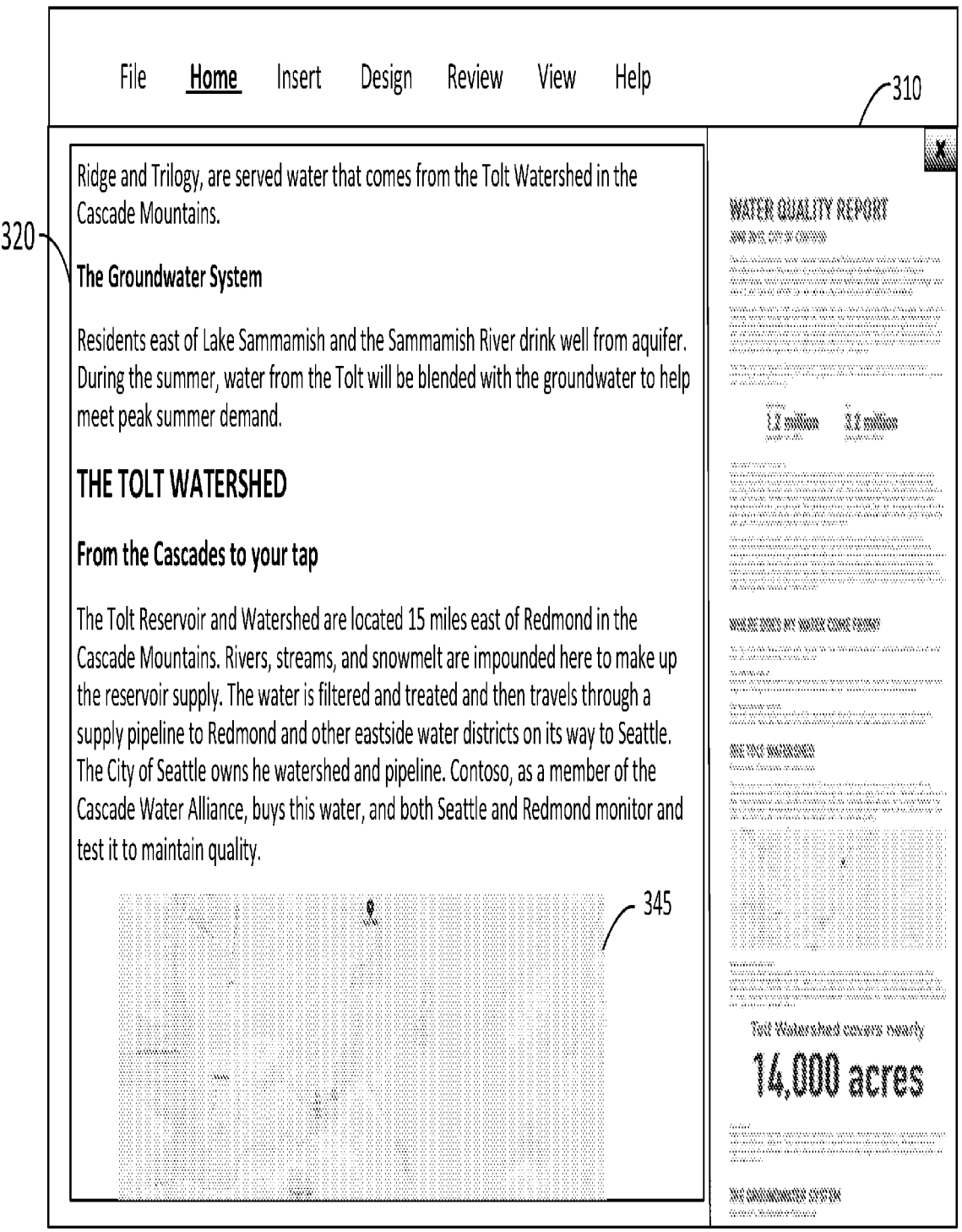

Once the user views the suggested map and/or previews its' insertion into the content, they may choose to insert it into to the document permanently, by clicking on the enhance menu option 370. FIG. 3E depicts an example GUI screen 300E for displaying the content pane 320 after the map corresponding to the Tolt Watershed has been inserted as suggested. Inserting the map can provide a clear visualization for the points outlined in the content, thus improving the quality of the document.

Figure 3F:
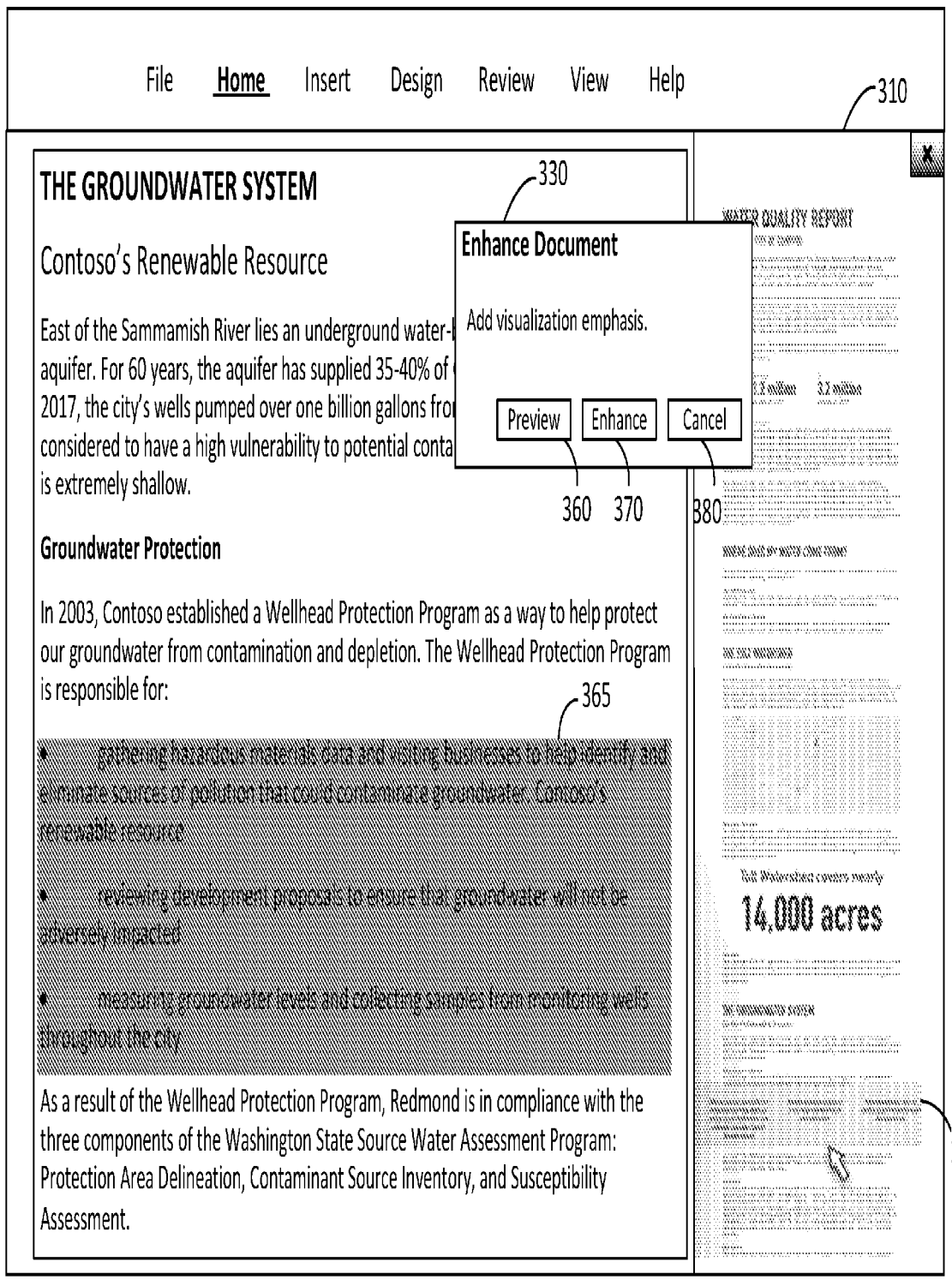

FIG. 3F depicts an example GUI screen 300F in which a suggested enhancement that provides visualization emphasis for bullet point items is selected. In one implementation, identifying suggested enhancements may include scanning the content to look for places where an attempt at providing emphasis can be improved. For example, if the user has chosen to use bullet points for three items, as illustrated in the content portion 365, the ML model may determine that a better mechanism for emphasizing this content is available. The improved mechanism may include displaying the items in three separate columns, as provided in the suggested enhancement 345. Once the suggested enhancement 345 is selected in the enhancements pane 310, the corresponding content 365 is highlighted and the UI element 330 is displayed to enable the user to interact with the suggestion, as desired.

After the user has viewed the suggested visualization emphasis and/or previewed it in the content, they may choose to apply the suggestion to the document, by clicking on the enhance menu option 370. FIG. 3G depicts an example GUI screen 300G for displaying the content pane 320 after the visualization emphasis provided in the suggested enhancement 345 has been applied to the content. Turning the bullet points into three centered text portions can provide more emphases on the items, making them more readable and as such improving the overall look of the document.

Figure 3H:
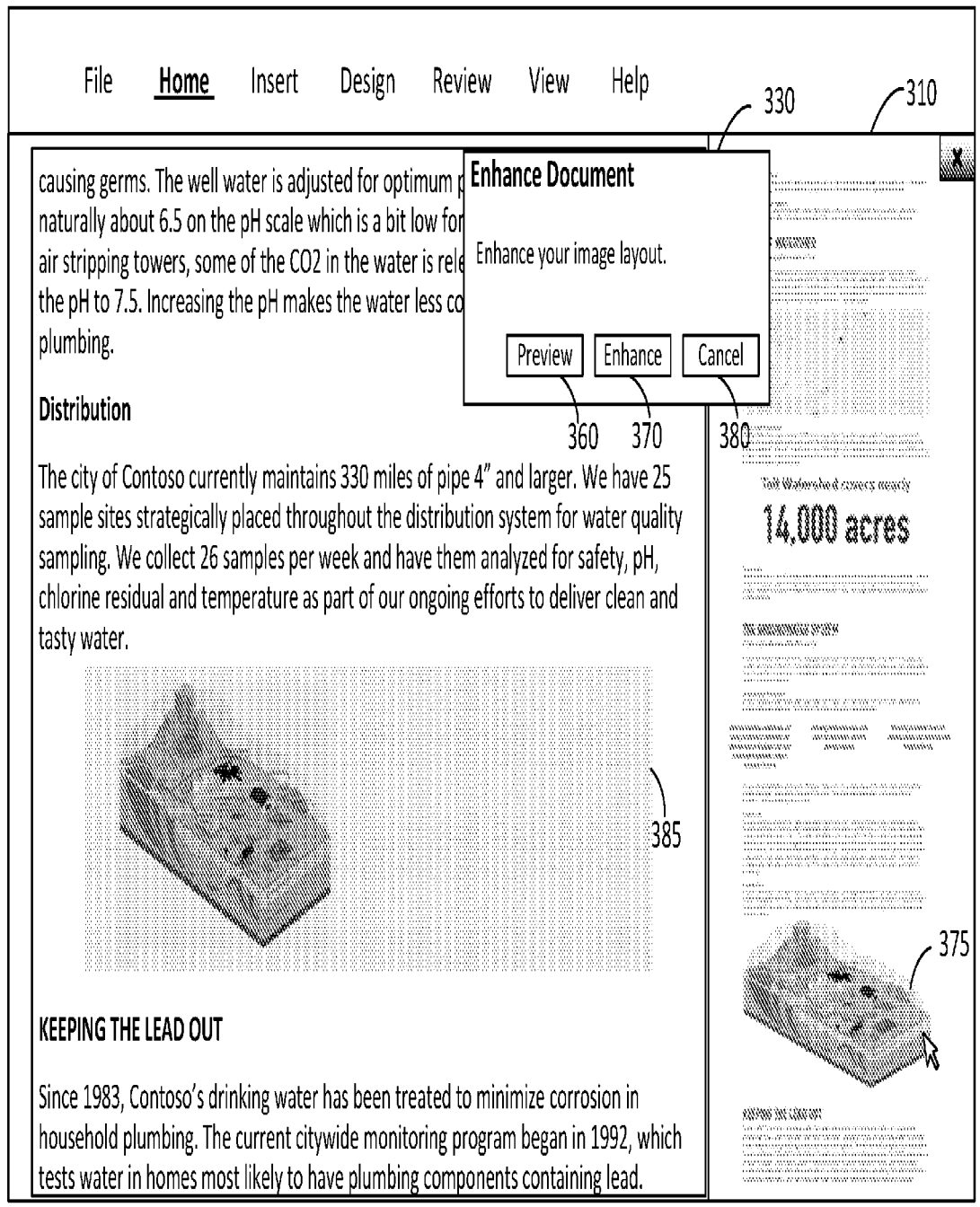

FIG. 3H depicts an example GUI screen 300H in which a suggested enhancement that relates to improving the quality of an image in the content is selected. In one implementation, identifying suggested enhancements may include scanning the content to look for images or other inserted items in the document and determine if they need to and/or can be improved. For example, if the content includes an image, the enhancement service may determine if the image can be identified and if so whether a higher quality image can be located. This may involve searching the user's storage media, searching an enterprise storage media and/or searching global storage repositories (e.g., publicly available storage servers such as online sources). Once a better-quality image is located, the enhancement service may determine if the better-quality image fits well within content of the document. When that is the case, the better-quality image may be presented as a suggested enhancement to the user. Once the suggested enhancement 375 is selected in the enhancements pane 310, the corresponding image 385 may be highlighted and the UI element 330 may be displayed to enable the user to interact with the suggestion, as desired.

Figure 3I:
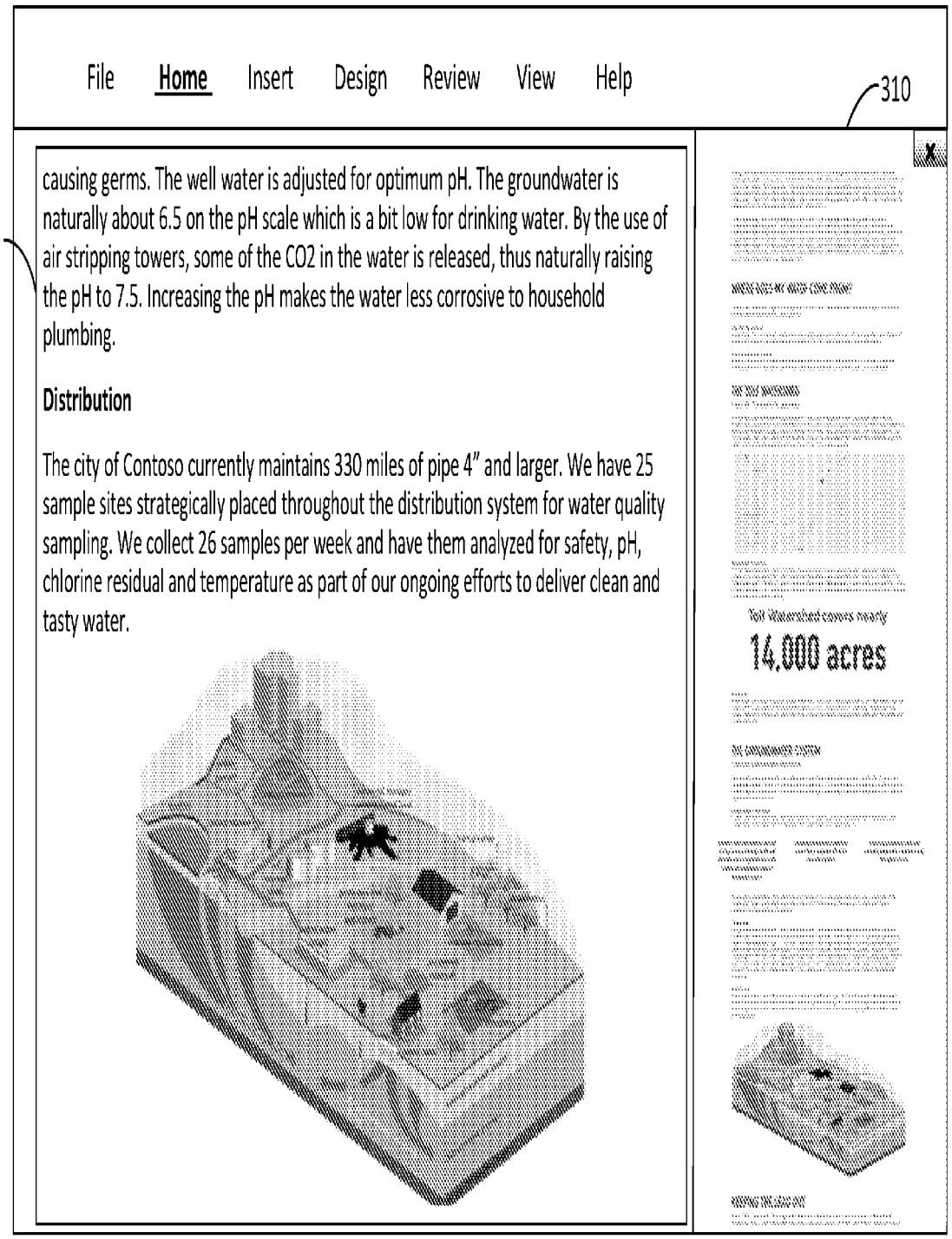

Once the user views the suggested higher-quality image and/or previews it in the content pane, they may choose to insert it into the document, by clicking on the enhance menu option 370. FIG. 3I depicts an example GUI screen 300I for displaying the content pane 320 after the higher-quality image provided in the suggested enhancement 375 has been inserted into the content.

In one implementation, the application providing the suggested enhancements may collect information from the document and/or the user as the user interacts with the suggested enhancements to better train the ML models used in providing suggested enhancements. For example, the application may collect information relating to which one of the suggested enhancements was approved by the user. To ensure that context is taken into account when using the information, the sentence structure, style, and subject of the document may also be collected. Additionally, other information about the document and/or the user may be collected. For example, information about the type of document (e.g., word document, email, presentation document, etc.), the topic of the document, the position of the user within an organization (e.g., the user's job title or department to which the user belongs, if known), and other non-linguistic features such as the time of the day, the date the device was used, the person to whom the document is directed (e.g., the to line in an email), and the like may be collected and used to provide better suggestions in the future. The user specific information may be used, in one implementation, to provide customized suggestions for the user. It should be noted that in collecting and storing this information, care must be taken to ensure privacy is persevered.

In one implementation, to ensure compliance with ethical and privacy guidelines and regulations, an optional UI element may be provided to inform the user of the types of data collected, the purposes for which the data may be used and/or to allow the user to prevent the collection and storage of user related data. The UI may be accessible as part of the features provided for customizing an application via a GUI displayed by the application when the user selects an options menu button. Alternatively, the information may be presented in a user agreement presented to the user when he/she first installs the application.

Figure 4:
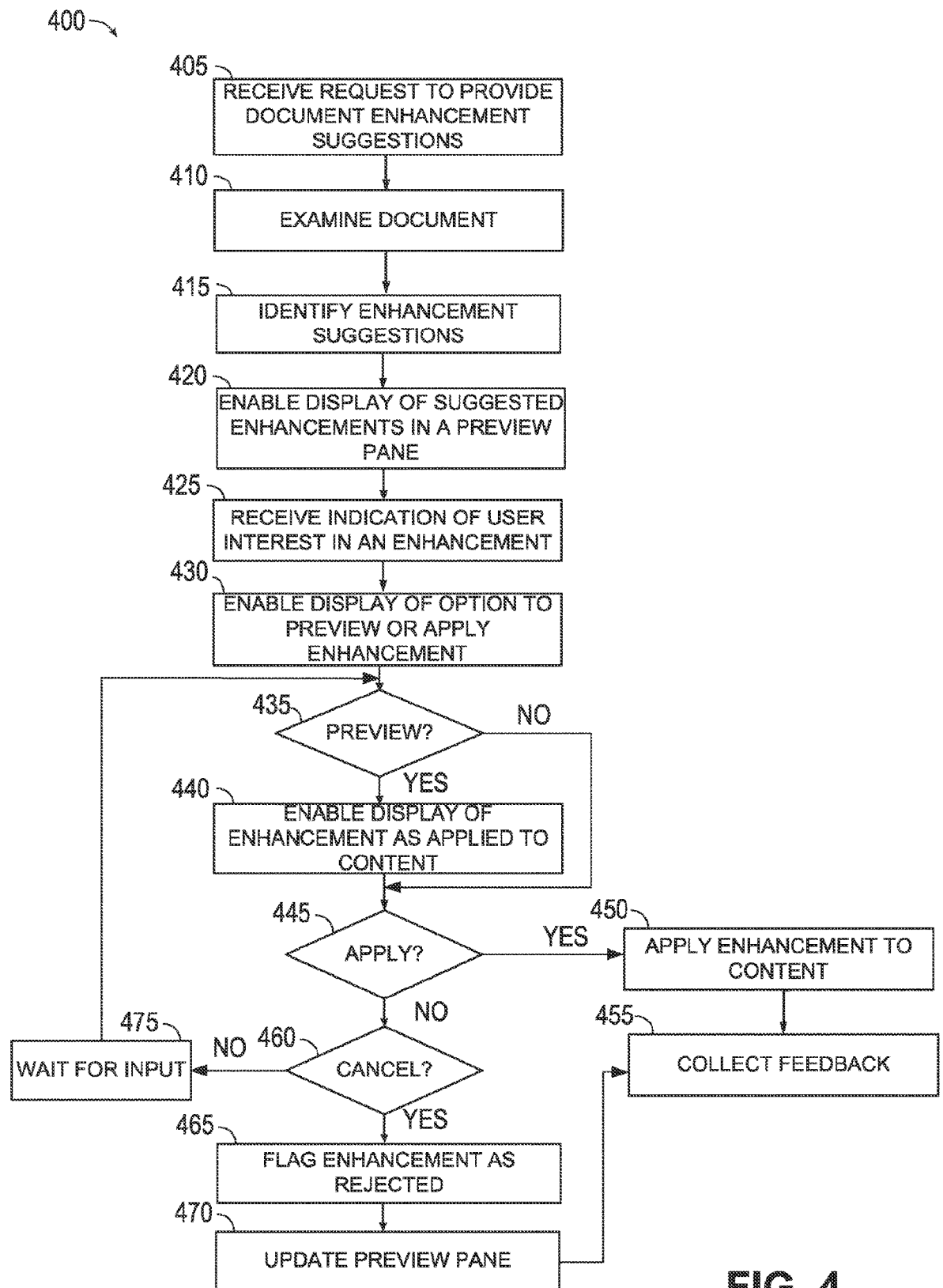
FIG. 4 is a flow diagram depicting an example method for identifying suggested enhancements for a document and presenting the suggested enhancements to the user in a user-friendly manner.

FIG. 4 is a flow diagram depicting an exemplary method 400 for identifying suggested enhancements for a document and presenting the suggested enhancements to the user in a user-friendly manner In an example, one or more steps of method 400 may be performed by an enhancement service (e.g., enhancement service 116 of FIG. 1) and/or a local enhancement engine (e.g., enhancement engine 124 of FIG. 1). Other steps of method 400 may be performed by the application providing content editing (e.g., applications 114 or applications 126 of FIG. 1). At 405, method 400 may begin by receiving a request to provide enhancement suggestions for a document. This may occur, for example, when the user utilizes an input/output device (e.g. a mouse) coupled to a computer client device to select a text segment (e.g., a text string containing one or more words) in a document and to invoke a UI element to request that enhancement suggestions be provided for the selected segment. In one implementation, a request may be received when a predetermined action takes place within the content pane (e.g., a special character is entered, or a predetermined keyboard shortcut is pressed). Moreover, the user may invoke a UI element to request that enhancement suggestions be provided for the entire document.

Once a request to identify enhancements has been received, method 400 may proceed to examine the document, at 410, to identify potential enhancements for suggestion, at 415. This may involve using an enhancement detection service. In one implementation, the process of identifying potential enhancements may include dividing the content into segments of a predetermined size (e.g., segments of nine consecutive words). The process of dividing the selected text portion into segments may involve using a bag of n-grams model. As is known in the art, such a process for words may include using an n-grams model with a bag of words similarities. This may involve making a list of n-grams by first dividing a paragraph into sentences and then extracting n-grams for each sentence in the paragraph. For example, when the segments are 7 words each (e.g., n=7), for a sentence having 10 words, two 7-grams are extracted from the sentence. The first 7-gram includes the first 7 words of the sentence and the second 7-gram includes the last 7 words of the sentence. Thus, the 10-word sentence may result in two different 7-word segments that overlap each other. Alternatively, the content may be searched for specific keywords that indicate an item can be inserted into the document for enhancement.

Once the text has been divided into segments or specific keywords have been identified, those segments and/or keywords may be used for running searches in one or more databases. In one implementation, a first level search may be conducted by examining a user specific database to determine if a relevant map, image or any other media item may be located for the user (e.g., by searching a user specific storage medium or searching enterprise and/or global databases). This may use an ML model and may be achieved by collecting and storing user history data from documents prepared by the user, analyzing the data to identify patterns in use, determining if the patterns indicate a desire by the user to insert a relevant item in the document for the selected segment, and examining the segment against the identified item to determine if it surpasses a relevance threshold (e.g., a score). The user specific databases, discussed here, may be stored and buffered locally, or they may be stored in a cloud storage device.

In one implementation, identifying enhancements may include examining the content of the document to identify potential areas for improvement. For example, headings, bullet lists, tables, graphs, and any images included in the document may be examined to determine if their style and/or quality may be improved. In an example, when an image is included in the document and a determination is made that the image is not of good quality (e.g., low resolution image), the enhancement service may search for a better-quality image either locally, at an enterprise level or globally. Furthermore, fonts, paragraph styles, and the like may be examined to determine if they can be enhanced. This may be done by utilizing one or more text analytics algorithms that may examine the contents, context, formatting and/or other parameters of the document to determine a style associated the document, keywords associated with the document (e.g. the title of the document), the type of document, and the like.

The text analytics algorithms may include natural language processing algorithms that allow topic or keyword extractions, for example, in the areas of text classification and topic modeling. Examples of such algorithms include, but are not limited to, term frequency-inverse document frequency (TF-IDF) algorithms and latent Dirichlet allocation (LDA) algorithms Topic modeling algorithms may examine the document to identify and extract salient words and items within the document that may be recognized as keywords. Keywords may then help determine the tone and type of document to help in determining the most appropriate enhancement suggestions. This is because different types of documents may require different styles. Thus, by identifying and examining keywords, the enhancement service may determine the topic of the document, which in turn, may help determine the best style for the document.

In one implementation, machine learning algorithms may be used to examine activity history of the user within the document or within the user's use of the application to identify patterns in the user's usage. For example, the types of enhancement suggestions accepted by the user in a previous session of the document (or earlier in the current session) may be examined to identify patterns. In another example, suggested enhancements that have already been provided and not approved in a prior session (or earlier in the current session) may be eliminated from the list of identified suggestions. This may be done during a prioritization and sorting process of identified suggestions. The history may be limited to the user's recent history (i.e., during a specific recent time period or during the current session) or may be for the entirety of the user's use of the application. This information may be stored locally and/or in the cloud. In one implementation, the history data may be stored locally temporarily and then transmitted in batches to a data store in the cloud which may store each user's data separately for an extended period of time, as long as the user continues using the application or as long as the user has granted permission for such storage and use.

In one implementation, suggestion history and data extracted from other users determined to be in a same category as the current user (e.g., in the same department, having the same job title, or being part of the same organization) may also be examined at this stage. Furthermore, the enhancement service or engine may consult a global database of enhancement history and document contents to identify global patterns. In one implementation, in consulting the global database, the method identifies and uses data for users that are in a similar category as the current user. For example, the method may use history data from users with similar activities, similar work functions and/or similar work products. The database consulted may be global but also local to the current device.

In one implementation, identifying relevant suggested enhancements may be achieved by utilizing two or more different types of trained ML models. One type could be a personal model which is trained based on each user's personal information and another could be a global model that is trained based on examination of a global set of other users' information. A hybrid model may be used to examine users similar to the current user and to generate results based on activities of other users having similar characteristics (same organization, having same or similar job titles, creating similar types of documents, and the like) as the current user. For example, it may examine users that create similar artifacts as the current user or create documents having similar topics. Another type of model that could be developed may be a domain and/or organization specific model. The ML models for such a model may be trained specifically based on documents the organization creates or documents focused on a specific domain. Any of the models may collect and store what is suggested and record how the user interacts with the suggestions (e.g., which suggestions they approve). This ensures that every time a user interacts with the system, the models learn from the interaction to make the suggestions better. The different models may be made aware of each other, so that they each benefit from what the other models are identifying, while focusing on a specific aspect of the task.

It should be noted that the models examining the contents and identifying suggested enhancements may be hosted locally on the client (e.g., local enhancement engine) or remotely in the cloud (e.g., enhancement service). In one implementation, some models are hosted locally, while others are stored in the cloud. This enables the client to provide some suggestions even when the client is not connected to a network. For example, the client may be able to provide a list of enhancement suggestions based on the current document and other local documents, but it may not be able to provide suggestions based on other users. Hosting the models locally may also address privacy concerns. Once the client connects to the network, the application may be able to provide better and more complete suggestions.

After a number of suggested enhancements have been identified for the document, a relevance/enhancement score may be calculated for each identified enhancement to determine which one(s) to present to the user. As discussed above, this may involve use of one or more ML models that are trained for determining relevance of enhancement suggestions for each document and/or user. Once the score is calculated, those enhancements that pass a threshold number may be selected for being displayed to the user. In one implementation, of the identified enhancements, a predetermined percentage may be selected for display.

Once enhancements have been identified and selected for display, the selected enhancement suggestions may be provided for being presented to the user, at 420. This may involve the enhancement service sending the enhancement suggestions to the application used by the user for creating/editing the document to enable display of the enhancements. As discussed above, the suggested enhancements may be presented in an enhancements pane which may provide a preview of the document with the suggested enhancements.

After the suggested enhancements have been presented to the user, the user may select one of the suggestions for review. In such an instant, the application may receive an indication of user interest via an input/output device, at 425. Once an input regarding a suggested enhancement has been received, method 400 may proceed to enable display of one or more options for interacting with the suggested enhancement, at 430. The options may include an ability to preview the enhancement within the content of the document, an ability to apply the suggested enhancement to the document or an ability to reject the suggested enhancement. As a result, method 400 may determine, at 435, if a user input indicating a request for previewing the enhancement within the content has been received.

When it is determined that a request to preview the enhancement has been received (Step 435, Yes), method 400 may proceed to enable display of the enhancement as applied to the content of the document, at 440. If, however, it is determined that a request to preview the enhancement has not been received or after the enhancement has been previewed (Step 435, No), method 400 may proceed to determine if a request to apply the enhancement to the content has been received. When it is determined that such a request has been received, method 400 may apply the enhancement to the content, at 450, before proceeding to collect feedback about the request, at 455. The feedback may be collected, transmitted and/or stored to be used in further training of the ML models as discussed above. The feedback may include both implicit and explicit feedback. For example, in addition or as an alternative to collecting information about users' preferences with respect to a suggestion, a UI element may be presented to the user for providing explicit feedback. This may include displaying a UI element that presents a question to the user as to the helpfulness of the enhancements. In an example, this may be presented as thumps up or thumps down buttons or like/dislike buttons. Furthermore, when collecting implicit feedback, in addition to tracking whether the user selects or rejects a suggestion, method 400 may also keep track of how the user interacts with a suggestion after its acceptance. This may include tracking whether any additional changes are made to the enhanced portion after a suggestion is accepted.

When a request for applying the enhancement to the content is not received, at 445, method 400 may proceed to determine if a request to cancel the selection of the suggestion has been received, at 460. If no request is identified as being received, then method 400 may proceed to step 475 to wait for input from the user before returning to step 435 to determine if the input involves a request for previewing the suggestion and repeating the subsequent steps of method 400. When, however, it is determined that a request to cancel the selection has been received, method 400 may proceed to flag the suggested enhancement as being rejected, at 465, before updating the enhancement preview pane, at 470. Method 400 may then proceed to step 455 to collect feedback about the rejection.

Because contextual information and user specific information may need to be collected in order to provide a context for learning and since this information and all other linguistic features may contain sensitive and private information, compliance with privacy and ethical guidelines and regulations is important. Thus, the collection and storage of user data may need to be protected against both maleficent attackers who might expose private data and accidental leakage by suggestions made to other users having learned from the data. As such, during the process of collecting and transmitting feedback information, the information may be anonymized and encrypted, such that any user-specific information is removed or encrypted to ensure privacy.

Thus, technical solutions for identifying potential enhancements to content of a document and presenting the identified enhancements in a user-friendly manner are disclosed. The methods may utilize one or more machine-trained models developed for identifying enhancement suggestions for a document based on multiple factors. The suggestions may be displayed in a preview pane alongside the document content to enable the user to quickly and efficiently approve the most appropriate suggested enhancements. This provides an easy and efficient technical solution for enabling users to not only view suggested enhancements but also determine quickly and properly how the enhancements may affect their document. This can improve the user's overall experience and increase their efficiency and proficiency when creating content.

Figure 5:
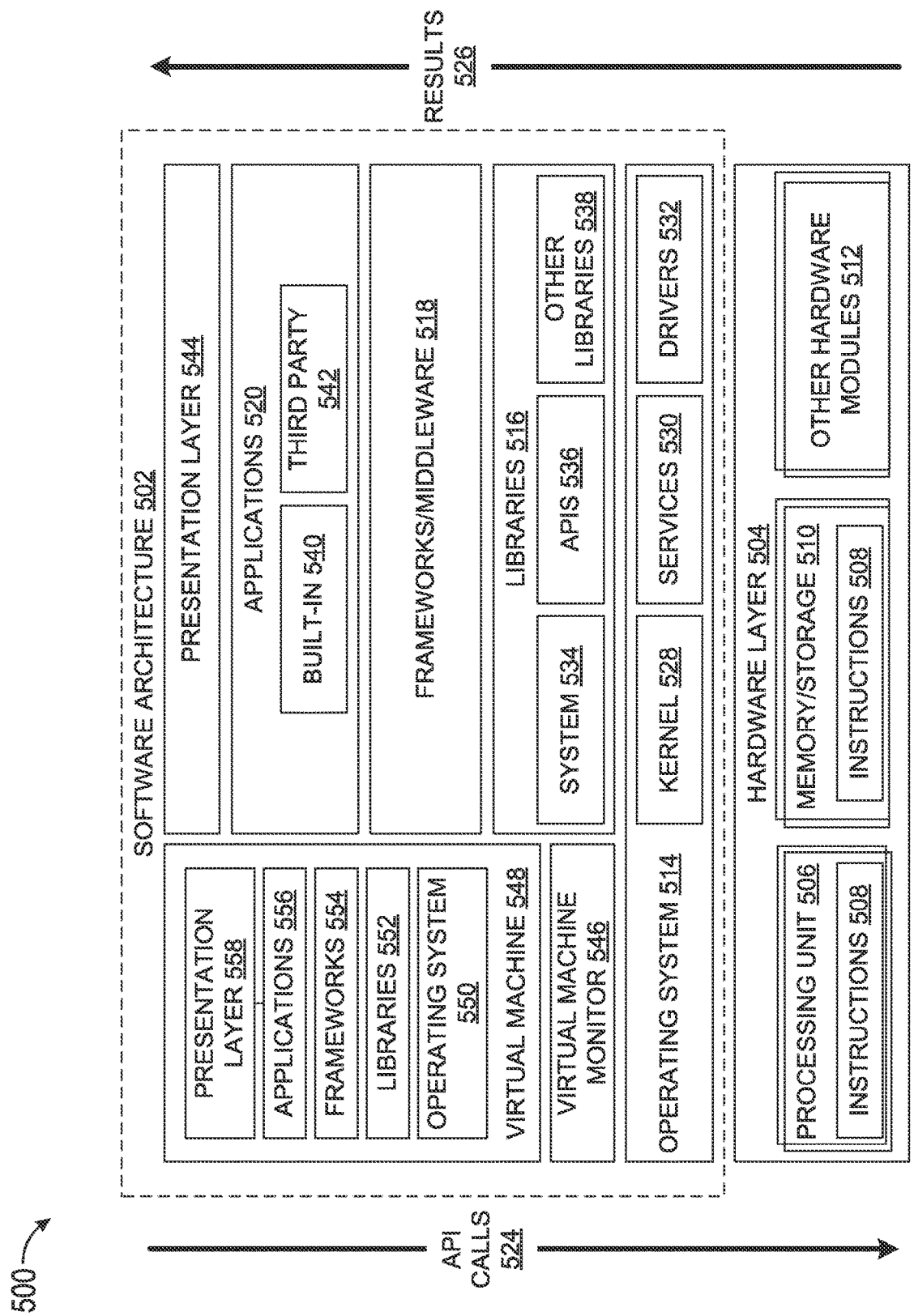
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 508 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 524. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various GUI functions, high-level resource management, or high-level location services. The frameworks 518 may provide a broad spectrum of other APIs for applications 520 and/or other software modules.

The applications 520 include built-in applications 520 and/or third-party applications 522. Examples of built-in applications 520 may include, but are not limited to, a contacts application, a browser application, a location application, a media application, a messaging application, and/or a game application. Third-party applications 522 may include any applications developed by an entity other than the vendor of the particular system. The applications 520 may use functions available via OS 514, libraries 516, frameworks 518, and presentation layer 524 to create user interfaces to interact with users.

Some software architectures use virtual machines, as illustrated by a virtual machine 528. The virtual machine 528 provides an execution environment where applications/modules can execute as if they were executing on a hardware machine (such as the machine 600 of FIG. 6, for example). The virtual machine 528 may be hosted by a host OS (for example, OS 514) or hypervisor, and may have a virtual machine monitor 526 which manages operation of the virtual machine 528 and interoperation with the host operating system. A software architecture, which may be different from software architecture 502 outside of the virtual machine, executes within the virtual machine 528 such as an OS 550, libraries 552, frameworks 554, applications 556, and/or a presentation layer 558.

Figure 6:
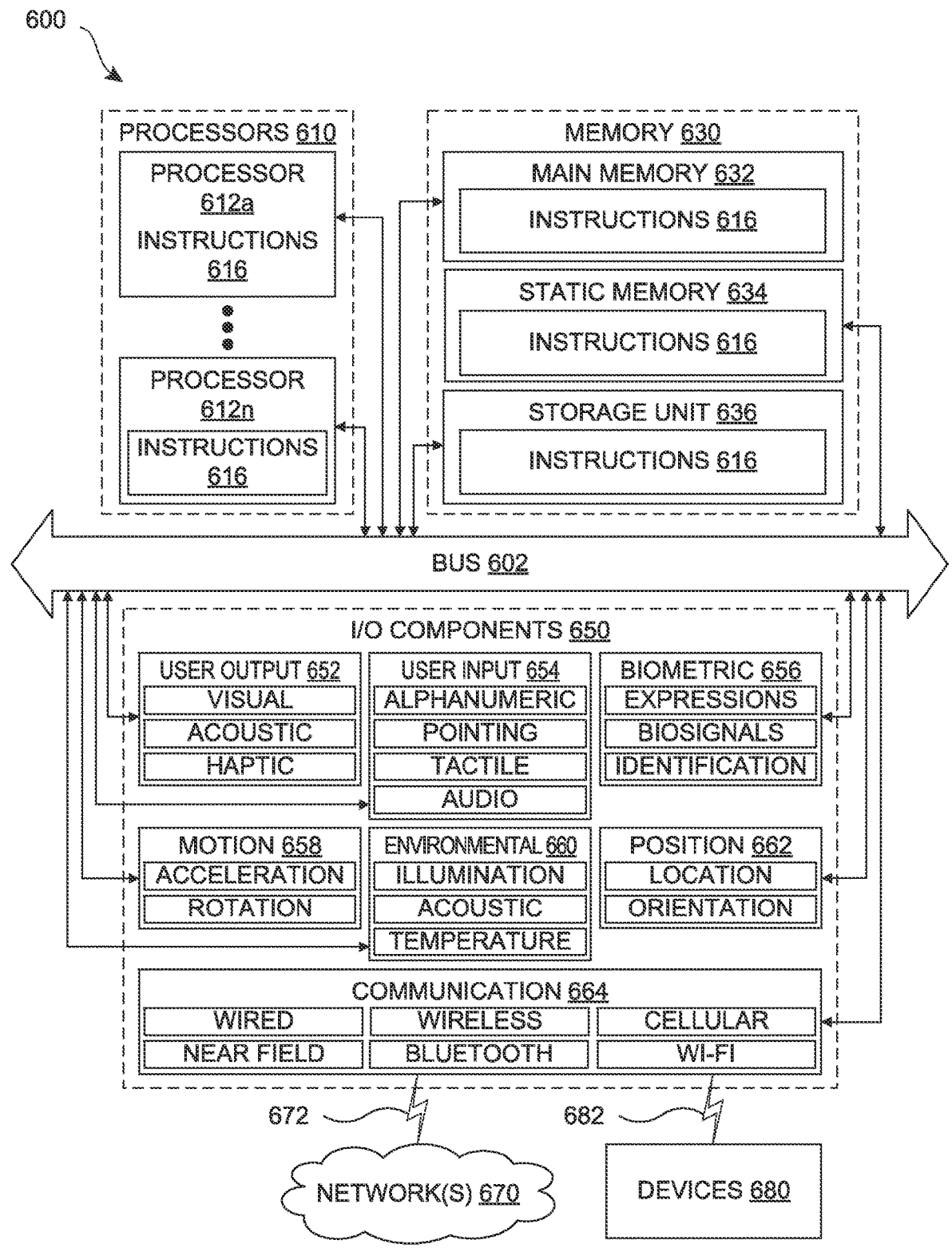
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers).

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-4) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
a processor; and
a memory in communication with the processor, the memory storing executable instructions that, when executed by the processor, cause the data processing system to perform functions of:
enabling display of a first user interface element for previewing the identified enhancement as applied to the content;
receiving a request to select the identified enhancement; and
upon receiving the request, enabling display of a second user interface element for accepting the identified enhancement,
wherein the first user interface element provides a preview of the document post enhancement.

Item 2. The data processing system of item 1, wherein the first user interface element is displayed alongside a third user interface element, the third user interface element displaying the content of the document prior to enhancement.

Item 3. The data processing system of item 2, wherein the first user interface element is displayed side-by-side with the third user interface element.

Item 4. The data processing system of any of the preceding items, wherein the second user interface element includes a first option for accepting the identified enhancement, and a second option for rejecting the identified enhancement.

Item 5. The data processing system of item 4, wherein the instructions further cause the processor to cause the data processing system to perform functions of:
upon receiving a request to reject the identified enhancement, updating the first user interface element to remove the identified enhancement from the content.

Item 6. The data processing system of any of the preceding items, wherein the instructions further cause the processor to cause the data processing system to perform functions of:
collecting data regarding rejection or acceptance of the identified enhancement, ensuring that the data is privacy compliant;
storing the data; and
using the data in training a machine-learning model for identifying the enhancement.

Item 7. The data processing system of any of the preceding items, wherein the content of the document exceeds more than one page and the first user interface element provides a preview of an entire content of the document post enhancement.

Item 8. A method for identifying enhancement suggestions for a document, comprising:
examining the document to identify an enhancement for a portion of content in the document;
enabling display of a first user interface element for previewing the identified enhancement as applied to the content;
receiving a request to select the identified enhancement; and
upon receiving the request, enabling display of a second user interface element for accepting the identified enhancement,
wherein the first user interface element provides a preview of the document post enhancement.

Item 9. The method of item 8, wherein the first user interface element is displayed alongside a third user interface element, the third user interface element displaying the content of the document prior to enhancement.

Item 10. The method of item 9, wherein the first user interface element is displayed side-by-side with the third user interface element.

Item 11. The method of any of items 8-10, wherein the second user interface element includes a first option for accepting the identified enhancement, and a second option for rejecting the identified enhancement.

Item 12. The method of item 11, further comprising:
receiving a selection of the first option; and
upon receiving the selection, applying the identified enhancement to the content of the document.

Item 13. The method of item 11, further comprising:
upon receiving a request to reject the identified enhancement, updating the first user interface element to remove the identified enhancement from the content.

Item 14. The method of any of items 8-13, further comprising:
collecting data regarding rejection or acceptance of the identified enhancement,
ensuring that the data is privacy compliant;
storing the data; and
using the data in training a machine-learning model for identifying the enhancement.

Item 15. A computer program that, when executed, causes a programmable device to carry out the method of any one of the items 8 to 14.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a memory in communication with the processor, the memory comprising executable instructions that, when executed by, the processor, cause the data processing system to perform functions of:
   examining content of a document to identify a plurality of portions of content in the document, wherein for each of the plurality of portions of content a suggested visual enhancement can be identified;
   identifying the suggested visual enhancement for each of the plurality of portions of content;
   enabling display of a first user interface element for previewing a plurality of suggested visual enhancements as applied to the content, each of the plurality of suggested visual enhancements being one of the identified suggested visual enhancements;
   receiving a request to select one of the identified suggested visual enhancements; and
   upon receiving the request, enabling display of a second user interface element for accepting the identified suggested visual enhancement,
   wherein the first user interface element provides a preview of the document post enhancement, and
   wherein the instructions further cause the processor to cause the data processing system to perform functions of:
      collecting user feedback data regarding rejection or acceptance of the identified suggested visual enhancement,
      ensuring that the user feedback data is privacy compliant;
      storing the user feedback data; and
      using the user feedback data in training a machine-learning model for identifying suggested visual enhancements.

2. The data processing system of claim 1, wherein the first user interface element is displayed alongside a third user interface element, the third user interface element displaying the content of the document prior to enhancement.

3. The data processing system of claim 2, wherein the first user interface element is displayed side-by-side with the third user interface element.

4. The data processing system of claim 1, wherein the second user interface element includes a first option for accepting the identified suggested visual enhancement, and a second option for rejecting the identified suggested visual enhancement.

5. The data processing system of claim 4, wherein the instructions further cause the processor to cause the data processing system to perform functions of:
   upon receiving a request to reject the identified suggested visual enhancement, updating the first user interface element to remove the identified suggested visual enhancement from the content.

6. The data processing system of claim 1, wherein the content of the document exceeds more than one page and the first user interface element provides a preview of an entire content of the document post enhancement.

7. A method for identifying enhancement suggestions for a document, comprising:
   examining content of the document to identify a plurality of portions of content in the document, wherein for each of the plurality of portions of content a suggested visual enhancement can be identified;
   identifying the suggested visual enhancement for each of the plurality of portions of content;
   enabling display of a first user interface element for previewing a plurality of suggested visual enhancements as applied to the content, each of the plurality of suggested visual enhancements being one of the identified suggested visual enhancements;
   receiving a request to select one of the identified suggested visual enhancements; and
   upon receiving the request, enabling display of a second user interface element for accepting the identified suggested visual enhancement,
   wherein the first user interface element provides a preview of the document post enhancement, and
   further comprising:
      collecting user feedback data regarding rejection or acceptance of the identified suggested visual enhancement,
      ensuring that the user feedback data is privacy compliant;
      storing the user feedback data; and
      using the user feedback data in training a machine-learning model for identifying suggested visual enhancements.

8. The method of claim 7, wherein the first user interface element is displayed alongside a third user interface element, the third user interface element displaying the content of the document prior to enhancement.

9. The method of claim 8, wherein the first user interface element is displayed side-by-side with the third user interface element.

10. The method of claim 7, wherein the second user interface element includes a first option for accepting the identified suggested visual enhancement, and a second option for rejecting the identified suggested visual enhancement.

11. The method of claim 10, further comprising:
    receiving a selection of the first option; and
    upon receiving the selection, applying the identified suggested visual enhancement to the content of the document.

12. The method of claim 10, further comprising:
    upon receiving a request to reject the identified suggested visual enhancement, updating the first user interface element to remove the identified suggested visual enhancement from the content.

13. A non-transitory computer readable medium on which are stored instructions that, when executed, cause a programmable device to perform operations of:
    examining content of a document to identify a plurality of portions of content in the document, wherein for each of the plurality of portions of content a suggested visual enhancement can be identified;
    identifying the suggested visual enhancement for each of the plurality of portions of content;
    enabling display of a first user interface element for previewing a plurality of suggested visual enhancements as applied to the content, each of the plurality of suggested visual enhancements being one of the identified suggested visual enhancements;

receiving a request to select one of the identified suggested visual enhancements; and upon receiving the request, enabling display of a second user interface element for accepting the identified suggested visual enhancement, wherein the first user interface element provides a preview of the document post enhancement, and wherein the instructions further cause the programmable device to perform operations of:

collecting user feedback data regarding rejection or acceptance of the identified suggested visual enhancement, ensuring that the user feedback data is privacy compliant;

storing the user feedback data; and using the user feedback data in training a machine-learning model for identifying suggested visual enhancements.

14. The non-transitory computer readable medium of claim 13, wherein the first user interface element is displayed alongside a third user interface element, the third user interface element displaying the content of the document prior to enhancement.

15. The non-transitory computer readable medium of claim 14, wherein the first user interface element is displayed side-by-side with the third user interface element.

16. The non-transitory computer readable medium of claim 13, wherein the second user interface element includes a first option for accepting the identified suggested visual enhancement, and a second option for rejecting the identified suggested visual enhancement.

17. The non-transitory computer readable medium of claim 16, wherein the instructions further cause the programmable device to perform operation of:

receiving a selection of the first option; and upon receiving the selection, applying the identified suggested visual enhancement to the content of the document.

18. The non-transitory computer readable medium of claim 13, wherein the instructions further cause the programmable device to perform operation of upon receiving a request to reject the identified suggested visual enhancement, updating the first user interface element to remove the identified suggested visual enhancement from the content.

* * * * *